United States Patent
Altman et al.

(10) Patent No.: US 10,349,462 B2
(45) Date of Patent: Jul. 9, 2019

(54) METHODS AND SYSTEMS FOR MANAGING BONDED COMMUNICATIONS ACROSS MULTIPLE COMMUNICATION NETWORKS

(71) Applicant: LiveU Ltd., Kfar Saba (IL)

(72) Inventors: Baruch Yosef Altman, Pardes-Hana (IL); Daniel Pisarski, Marlton, NJ (US)

(73) Assignee: LIVEU LTD., Kfar Saba (IL)

( * ) Notice: Subject to any disclaimer, the term of this patent is extended or adjusted under 35 U.S.C. 154(b) by 56 days.

(21) Appl. No.: 15/509,339

(22) PCT Filed: Sep. 8, 2015

(86) PCT No.: PCT/IL2015/050917
§ 371 (c)(1),
(2) Date: Mar. 7, 2017

(87) PCT Pub. No.: WO2016/038611
PCT Pub. Date: Mar. 17, 2016

(65) Prior Publication Data
US 2017/0251515 A1    Aug. 31, 2017

Related U.S. Application Data

(60) Provisional application No. 62/047,252, filed on Sep. 8, 2014.

(51) Int. Cl.
*H04L 12/729* (2013.01)
*H04W 76/25* (2018.01)
(Continued)

(52) U.S. Cl.
CPC ............ *H04W 76/25* (2018.02); *H04L 43/08* (2013.01); *H04L 45/125* (2013.01);
(Continued)

(58) Field of Classification Search
CPC . H04L 41/0816; H04L 12/2867; H04L 69/14; H04L 45/245; H04L 2012/5624;
(Continued)

(56) References Cited

U.S. PATENT DOCUMENTS

| 7,948,933 B2 | 5/2011 | Ohayon et al. |
| 8,125,989 B2 | 2/2012 | Kissel |

(Continued)

FOREIGN PATENT DOCUMENTS

| CA | 2664349 | 4/2008 |
| CN | 101584157 | 11/2009 |

(Continued)

OTHER PUBLICATIONS

Kobayashi et al., Maturing of Open Flow and Software-defined Networking through deployments, Computer Networks 61 (2014) 151-175.

(Continued)

*Primary Examiner* — Jung Liu
(74) *Attorney, Agent, or Firm* — Pearl Cohen Zedek Latzer Baratz LLP

(57) ABSTRACT

A computing method of using a processor to manage a virtualization of a network bonding connection includes organizing one or a plurality of network bonding engines, each of the network bonding engines configured to split input data from at least one input data source into a plurality of data streams communicated over a plurality of wireless IP connections of different performance characteristics, or to reassemble the input data from the plurality of data streams. The organizing of the one or a plurality of network bonding engines includes choosing one or more wireless IP connections from the plurality of wireless IP connections to form one or more bonding groups through which the split data is (Continued)

communicated, and assigning network functions to each of the one or more bonding groups.

24 Claims, 4 Drawing Sheets

(51) Int. Cl.
*H04L 12/26* (2006.01)
*H04L 29/12* (2006.01)
*H04W 24/02* (2009.01)
*H04L 12/709* (2013.01)
*H04L 12/24* (2006.01)
*H04W 4/80* (2018.01)
*H04W 84/04* (2009.01)
*H04W 84/18* (2009.01)

(52) U.S. Cl.
CPC ........ *H04L 45/245* (2013.01); *H04L 61/2503* (2013.01); *H04W 24/02* (2013.01); *H04L 41/5009* (2013.01); *H04W 4/80* (2018.02); *H04W 84/042* (2013.01); *H04W 84/18* (2013.01); *Y02D 50/30* (2018.01)

(58) Field of Classification Search
CPC ... H04L 5/0035; H04L 5/0055; H04L 5/0057; H04L 12/2869; H04L 12/5695; H04L 47/00; H04L 47/70; H04L 47/78; H04L 47/821; H04L 47/827; H04L 41/5054; H04L 41/5096; H04L 67/1002; H04L 63/0209; H04L 63/20; H04W 72/04
See application file for complete search history.

(56) References Cited

U.S. PATENT DOCUMENTS

| | | | |
|---|---|---|---|
| 8,467,337 B1 | 6/2013 | Ohayon et al. | |
| 8,488,659 B2 | 7/2013 | Ohayon et al. | |
| 8,649,402 B2 | 2/2014 | Ohayon et al. | |
| 8,737,436 B2 | 5/2014 | Ohayon et al. | |
| 8,787,966 B2 | 7/2014 | Altman | |
| 8,811,292 B2 | 8/2014 | Ohayon et al. | |
| 8,848,697 B2 | 9/2014 | Ohayon et al. | |
| 8,942,179 B2 | 1/2015 | Ohayon et al. | |
| 8,942,215 B2 | 1/2015 | Mallet et al. | |
| 8,964,646 B2 | 2/2015 | Ohayon et al. | |
| 8,984,576 B2 | 3/2015 | Sze et al. | |
| 9,042,444 B2 | 5/2015 | Frusina et al. | |
| 9,154,247 B2 | 10/2015 | Altman | |
| 9,203,498 B2 | 12/2015 | Ohayon et al. | |
| 9,338,650 B2 | 5/2016 | Stein et al. | |
| 9,357,427 B2 | 5/2016 | Sze et al. | |
| 9,369,921 B2 | 6/2016 | Altman | |
| 9,379,756 B2 | 6/2016 | Altman | |
| 9,538,513 B2 | 1/2017 | Ohayon et al. | |
| 9,692,913 B2 | 6/2017 | Altman | |
| 9,712,267 B2 | 7/2017 | Altman | |
| 9,736,079 B2 | 8/2017 | Sze et al. | |
| 9,756,468 B2 | 9/2017 | Frusina et al. | |
| 2005/0066033 A1 | 3/2005 | Cheston et al. | |
| 2005/0185621 A1 | 8/2005 | Sivakumar et al. | |
| 2005/0243835 A1 | 11/2005 | Sharma et al. | |
| 2006/0098573 A1* | 5/2006 | Beer | H04L 12/2856 370/230 |
| 2008/0285555 A1 | 11/2008 | Ogasahara | |
| 2008/0320501 A1* | 12/2008 | Li | G06F 9/4411 719/324 |
| 2012/0039391 A1 | 2/2012 | Frusina et al. | |
| 2013/0142234 A1 | 6/2013 | Ohayon et al. | |
| 2013/0155231 A1 | 6/2013 | Ohayon et al. | |
| 2013/0227670 A1* | 8/2013 | Ahmad | H04L 41/5054 726/11 |
| 2014/0040442 A1* | 2/2014 | Saavedra | H04L 12/2867 709/221 |
| 2014/0112191 A1 | 4/2014 | Farkas | |
| 2014/0355446 A1 | 12/2014 | Altman | |
| 2014/0376370 A1* | 12/2014 | Cioffi | H04L 45/245 370/230 |
| 2015/0244580 A1* | 8/2015 | Saavedra | H04L 41/0816 709/221 |
| 2015/0263991 A1* | 9/2015 | Macchiano | H04L 47/41 370/400 |
| 2017/0195208 A1 | 7/2017 | Kissel | |

FOREIGN PATENT DOCUMENTS

| | | |
|---|---|---|
| CN | 103414917 | 11/2013 |
| EP | 1976202 | 10/2008 |
| EP | 2074762 | 7/2009 |
| HK | 1137278 | 4/2014 |
| IL | 197687 | 12/2009 |
| KR | 1020090082366 | 7/2009 |
| WO | WO 2008/038261 | 4/2008 |
| WO | WO 2013/171648 | 11/2013 |
| WO | WO 2014/036640 | 3/2014 |
| WO | WO 2014/055680 | 4/2014 |
| WO | WO 2015/188935 | 12/2015 |

OTHER PUBLICATIONS

Ford et al., TCP Extensions for Multipath Operation with Multiple Addresses, Internet Engineering Task Force (IETF), Jan. 2013, 1-64, ISSN: 2070-1721.
Ford et al., TCP Extensions for Multipath Operation with Multiple Addresses, Internet Engineering Task Force (IETF), Jul. 28, 2017, Internet-Draft, 1-73.
Bagnulo, M., Threat analysis for TCP extension for multipath operation with multiple addresses, Internet Engineering Task Force (IETF), Mar. 2011, 1-17, ISSN: 2070-1721.
Ford et al., Architectural Guidelines for Multipath TCP Development, Internet Engineering Task Force (IETF), Mar. 2011, 1-28, ISSN: 2070-1721.
Raiciu et al., Coupled Congestion Control for Multipath Transport Protocols, Internet Engineering Task Force (IETF), Oct. 2011, 1-12, ISSN: 2070-1721.
Scharf et al., Multipath TCP (MPTCP) Application Interface Considerations, Internet Engineering Task Force (IETF), Mar. 2013, 1-31, ISSN: 2070-1721.
Bagnulo, M., Analysis of Residual Threats and Possible Fixes for Multipath TCP (MPTCP), Internet Engineering Task Force (IETF), Jul. 2015, 1-19, ISSN: 2070-1721.
Bonaventure et al., Use Cases and Operational Experience with Multipath TCP, Internet Engineering Task Force (IETF), Jan. 2017, 1-30, lISSN: 2070-1721.

* cited by examiner

METHODS AND SYSTEMS FOR MANAGING BONDED COMMUNICATIONS ACROSS MULTIPLE COMMUNICATION NETWORKS

CROSS-REFERENCE TO RELATED APPLICATIONS

This application is a National Phase Application of PCT International Application No. PCT/IL2015/050917, filed Sep. 8, 2015, which claims priority from U.S. Provisional Patent Application No. 62/047,252, filed Sep. 8, 2014, all of which are incorporated herein by reference.

FIELD OF THE INVENTION

The present disclosure relates to network communications. More specifically, the present invention relates to methods and systems for organizing resources and networking functions for bonded communication across multiple communication networks.

BACKGROUND OF THE INVENTION

A single communication channel used in communication networks, such as in a cellular network, may be insufficient to provide the desired performance characteristics required by users and applications, such as bandwidth, quality of service, area coverage, channel capacity, latency, error rate, continuity, stable vs unstable (jitter) behavior, and data throughput. To address this problem, an incoming data stream may be split into multiple data streams, which are communicated over respective multiple communication channels, and the data streams reassembled into a single data stream at the destination IP address or addresses.

SUMMARY OF THE INVENTION

There is thus provided, in accordance with some embodiments of the present invention, a computing method of using a processor to manage a virtualization of a network bonding connection, the method including: organizing one or a plurality of network bonding engines, each of the network bonding engines configured to split input data from at least one input data source into a plurality of data streams communicated over a plurality of wireless IP connections of different performance characteristics, or to reassemble the input data from said plurality of data streams; wherein the organizing of said one or a plurality of network bonding engines includes choosing one or more wireless IP connections from the plurality of wireless IP connections to form one or more bonding groups through which the split data is communicated; and assigning network functions to each of the one or more bonding groups.

Furthermore, in accordance with some embodiments of the present invention, the different performance characteristics are selected from the group consisting of: a link throughput; a link goodput; a link temporal jitter; a link latency; a quality of service; a bandwidth; a wireless technology; an error correction method; a chosen basestation; a data package; a service level agreement (SLA); a service type; a different IP routing; different cellular operators; a channel capacity; and an area coverage.

Furthermore, in accordance with some embodiments of the present invention, choosing the one or more wireless connections to form the one or more bonding groups includes creating an ad-hoc network between two or more bonded mobile devices.

Furthermore, in accordance with some embodiments of the present invention, creating the ad-hoc network includes using a short-range wireless protocol to bond the two or more mobile devices, and the method includes communicating the split data using a wireless IP protocol.

Furthermore, in accordance with some embodiments of the present invention, the one or more bonding groups remain static over a session.

Furthermore, in accordance with some embodiments of the present invention, the one or more bonding groups dynamically change within a session in response to changing network conditions.

Furthermore, in accordance with some embodiments of the present invention, the method includes changing the chosen one or more wireless IP connections in the one or more bonding groups through which the split data is communicated so as to optimize the communication of the split data in accordance with network conditions.

Furthermore, in accordance with some embodiments of the present invention, the method includes detecting by one of said one or a plurality of network bonding engines a failure in communicating one or more of the plurality of data streams, and sending a failure alert to another network bonding engine of said one or a plurality of network bonding engines.

Furthermore, in accordance with some embodiments of the present invention, the network functions are selected from the group consisting of a hub, a router, a switch, a databridge, and an audio/video transmitter.

Furthermore, in accordance with some embodiments of the present invention, the method includes forwarding network security requirements by one of said one or a plurality of network bonding engines to another of said one or a plurality of network bonding engines.

Furthermore, in accordance with some embodiments of the present invention, the method includes changing the chosen one or more wireless IP connections in the one or more bonding groups in accordance with the forwarded network security requirements.

Furthermore, in accordance with some embodiments of the present invention, at least two bonding groups of the one or more bonding groups are formed from the same IP connection of said plurality of wireless IP connection.

Furthermore, in accordance with some embodiments of the present invention, two of said one or a plurality of network bonding engines are associated with said plurality of wireless IP connections.

Furthermore, in accordance with some embodiments of the present invention, at least one of said plurality of wireless IP connections have network parameters that change over time.

There is further provided, in accordance with some embodiments of the present invention, a system for managing a virtualization of a network bonding connection, the system includes a memory and a processor configured to organize one or a plurality of network bonding engines, each of the network bonding engines configured to split input data from at least one input data source into a plurality of data streams communicated over a plurality of wireless IP connections of different performance characteristics, or to reassemble the input data from said plurality of data streams; wherein the organizing of said one or a plurality of network bonding engines includes choosing one or more wireless IP connections from the plurality of wireless IP connections to form one or more bonding groups through which the split data is communicated; and assigning network functions to each of the one or more bonding groups.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
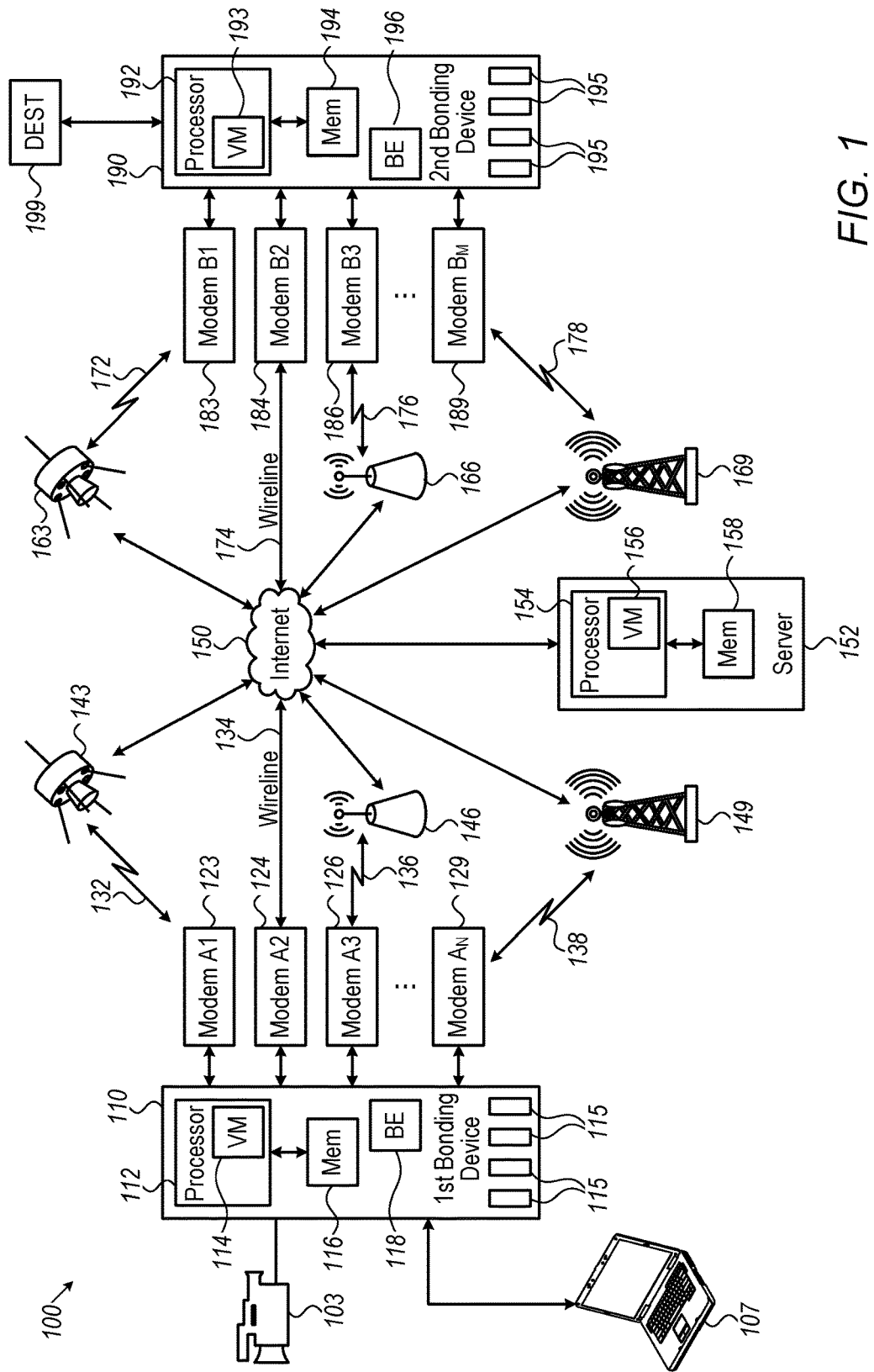
FIG. 1 is a schematic illustration of the communication paths between a first bonding device and a second bonding device, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The method of splitting data in multiple data streams which are transmitted across two or more communication channels, or IP connections, from the input data source to the destination IP address or addresses is known hereinbelow as "bonding" of the communication channels, or connections.

Bonding systems are described, for example, in the references listed below. U.S. Pat. No. 7,948,933 describes bonding for live video uplink, whose disclosure is incorporated herein by reference. Similarly, U.S. Pat. No. 8,649,402 describes a virtual broadband receiver and method of receiving data, whose disclosure is incorporated herein by reference. U.S. Patent Application Publication No. US2013/0155231 describes transmission and receiver units for remote wireless bonded communication, whose disclosure is incorporated herein by reference. Finally, U.S. Patent Application Publication No. US2014/0355446, whose disclosure is incorporated herein by reference, describes a bonding device for facilitating media transmission over a wireless network.

In some embodiments of the present invention, an approach to provide abstraction and virtualization of a device, software, or both that bonds multiple IP interfaces into a virtual IP interface is described hereinbelow. The virtual IP interface can then be used by other processes and protocols in a device and across a network. In this fashion, the bonding device may be used by networks and network functions seamlessly, such as by an IP router, switch, an SDN element (Software Defined Network), NFV (Network Function Virtualization) element, SDR (Software Defined Radio) or other networking device in a seamless way.

However, little effort has been put into standardizing the management of the bonded/aggregated links. For example, a specification released by the IEEE, called Link Aggregation Control Protocol (LACP), discusses exchanging frames in order to automatically identify two sides of individual links that implement LACP, (e.g., what links are currently available) and to aggregate them into a single logical link. This technology is very limited and is intended to address auto-identification of available links between two LACP nodes.

LACP does not provide abstraction, and requires sending dedicated LACPDU frames over ALL of the links in the network. LACP doesn't provide bonding/aggregation configurations such as which links shall execute which applications. Nor does LACP provide abstraction to be used for higher OSI model layers, including such actions to allowing the other OSI layers and higher level applications to identify, monitor, decide, and change which links shall be aggregated into which groups at each dynamic point in time.

Similarly, other networking protocols, such as IEEE Shortest Path Bridging (802.1aq, and its predecessor 802.3ad) and Link Aggregation 802.1AX identify all links as belonging to the same single physical MAC client. These protocols address the issue of automatic load balancing to provide resiliency.

The protocols above do not address problems of dynamic management of configuration and interfacing of packet routing and switching in wireless links (and especially cellular links) possessing large dynamic range and fluctuations in many network parameters or conditions (e.g., link impairments such as error rates, latency, throughput, jitter, etc).

Some embodiments of the current invention disclose methods for the dynamic management of packet routing and switching in wireless links to overcome the link impairments described above, and to decide which links to aggregate according to their delivery requirements of data packets, in general, and more specifically, for an application.

Multi-Chassis Link Aggregation protocols, which are proprietary vendor-specific protocols for switches that implement Link Aggregation, add device redundancy to the link redundancy. These protocols allow devices, or nodes, of the network to communicate with one another in a proprietary way, and to switch between them in case of failures.

Generally, a bonding device is not considered part of the network if the device is not managed in a standard generic way similar to all other network elements. Data routing through bonding devices, managing them as standard network elements and resources, cannot be done by standard methods. Furthermore, bonding systems do not offer scalability for hundreds and thousands of bonding end-devices or edge-devices. For example, known bonding systems and methods are not part of the Software-Defined Radio (SDR), Software-Defined Networking (SDN) and Network Functions Virtualization (NFV) abstractions. Moreover, known bonding systems are not part of self-organizing, self-healing networking, and routing schemes.

However, since bonding systems and devices are connected to multiple networks, routing signals through several different networking interfaces (for example, one Cellular Operator A—cellular network interface, 4G LTE Cellular network interface, two Cellular Operator B—cellular networking interface, one cable networking interface, and one SATCOM networking interface), offers the potential to utilize the properties of the different networking protocols across these multiple network interfaces in a seamless way, such as in the cases of network failure, optimization, and scalability. Utilizing the tradeoffs between the different network protocols can be used in various access systems or scenarios such as SOHO (Small Office Home Office), houses, mobile access (such as in cars, trucks, trains, ships, command and control, rapid deployment, mobile or temporary WiFi access points, mobile or temporary cellular base transceiver stations for LTE small cells).

Hence, some embodiments of the present invention relate to methods, systems and technologies for allowing the opening of the traditionally closed bonding systems to be used by other standard elements used to communicate data in IP networks, which enable the optimal utilization of the bonding system resources, as well as collected information about these resources, and of overall network resources. The bonding devices referred to herein are not only Layer 2 data-bridge devices, but also video bonding devices, Layer 3 bonding routers, access points, etc.

Since bonding devices route data through different links/connections, network interfaces, medium technologies, paths, routes, network hops/segments, and trust domains, the use of bonding devices as backup devices, broadband access devices, and mobile access devices also make them non-standard and non-transparent to the network management functions. Since a packet may travel in a multiplicity of routes between the edge device and the infrastructure bonding node, or from one edge bonding device to another edge bonding device, the decision as to which route to use changes momentarily by the bonding mechanisms according to their internal bonding algorithms in the bonding devices.

Moreover, the decision as to which routes to use is not predictable, since the performance characteristics (e.g., goodput/throughput, bandwidth, delay, latency, jitter, etc.) is subject to many impairments in each of the links. Network management, or an SDR/SDN/NFV management entity, which can decide on the routing and management, is difficult and non-trivial to implement for this case of multi-dimensional parameters optimization of multi-modem/network/IP connections, with so many network parameters which may continually change over short and long periods of time.

In some embodiments of the present invention, methods for enabling bonding devices described hereinbelow allow the same interfaces to participate in more than one bond, or bonding group, or a group of network elements participating in any specific bonded connectivity as will be described in detail later. In addition, an interface participating in a bonding group can still be addressed as an individual interface. This allows other processes and protocols on the device or across the network to address an individual interface or one or more virtual IP interfaces that represent a bonding of one or more of all the interfaces available to the device.

In some embodiments of the present invention, a network element, e.g., a network interface may belong, or be associated with two or more bonding groups. For example, a networking interface used by a bonding device can belong to two or more bonding groups or bonding sets. A network device, accessing cellular, WiFi, SATCOM network interfaces, as well as wired network interfaces, such as LAN and cable interfaces, for example, may be dynamically controlled by the upper-hierarchy routing functions, moved from one bonding group or bonding set to another group or set. For example, a bonding group or set may be associated with one or more parameters—performance and functional operation of the network resources, such as service level agreements (SLA), Quality of Service (QoS), service type (e.g., live video streaming, web surfing, and Internet of Things), low volume and augmented reality high volume data with very low latency, networking protocols (e.g., UDP, TCP, and HTTPS), Tunnel/VPN, end user/customer, cost, destination point/address, and bonding device (source and/or destination).

Accordingly, in some embodiments of the present invention, a remote, a local network management entity, or a SDR/SDN/NFV management entity known hereinafter as a "virtualization manager" may issue commands to change a set of bonds in bonding devices, which cause a set of connections or routes to serve a device or a networking requirement. The commands may be generated in any layer of the OSI 7 layers model (e.g. routers, switches, bridge, hub, simple network management protocol (SNMP) management function, etc.). The virtualization managers may be distributed in multiple networks, and not necessarily reside in a single network node.

Multiple virtualization managers may have their activities or commands, coordinated between them by using various networking or proprietary protocols. Alternatively, a first virtualization manager may generate commands at one node, or layer in the network, and second virtualization manager may receive the commands from the first virtualization manager and decide whether to use them. For example, if a certain networking interface has been instructed to change its association to a certain set of networking interfaces that create a virtual connection (bond), then a local (on-device) node may decide whether to use the instructions for certain connections or not.

In some embodiments of the present invention, virtual interfaces may be created (enabled) or destroyed (disabled) dynamically, on-demand, or when receiving instructions from within an operating system in a computing device (e.g., from multiple virtualization managers or from a single, master virtualization manager).

Another important aspect in the use of virtualization managers, as described in some embodiments of the present invention, is that programmatic control of the virtual interfaces (control plane) may be separated from packet processing (data plane) because the enabling, disabling and query operations may take place via mechanisms logically separated from the resultant bonded, virtual port or interface. This allows separation of the control and data planes throughout the communication networks, thus allowing the data plane to be implemented in hardware, and the control plane to be virtualized as described in some of the embodiments herein.

Furthermore, in accordance with the standards and practices in routing and networking, abstraction and virtualization of the multiple underlying networks and routing, including of fail-over, load-balancing and aggregation are also included in some embodiments of the present invention. For example, bonding as described herein enables simultaneous usage of multiple networks, network interfaces, or data channels of the same operator, technology, and network. Alternately or alternatively, bonding may involve the simultaneous usage of network interfaces or data channels belonging to multiple different operators.

Some embodiments of the present invention enable abstraction and virtualization of issues such as addressing (IPV4, IPV6), port forwarding, traffic types and protocols, management of elements/links/network interfaces as well as routing connections (unidirectional or bidirectional links)

for any state of data packet traffic, such as the bonding status, the stand-alone link, the load-balancing, VPN and similar tunnels creation, management, destruction, self-healing of routes and of traffic. Whereas a packet may travel over multiple different possible/optional routes, as originally intended to be decided at the bonding elements level in accordance with bonding algorithms, in some of the embodiments described herein information about the networking resources are now considered to determine data routing, which may belong in part or in full to several network or service providers, not all of them necessarily included in the specific managed network. Stated differently, the use of a virtualization manager allows for the controlling the flow of data across equipment that is operated by more than one operator.

In some embodiments of the present invention, an abstraction function/element may generate a virtual "tunnel" as termed in SDN architecture, where the underlying multiple channels, links, technologies, network operators, security protocols, vendors of bonding devices or technologies, and actual bonding devices, can all be abstracted from higher communication layers. Hence in this case, for the upper network layers, routing, management, prioritization, security, authorization, billing, accounting and any other desired functionality, the components building up this tunnel are abstracted and only the tunnel features and capabilities themselves are exposed by the virtualization manager to be monitored and/or managed by these higher layers. Also, dynamically, these features and capabilities may change the network elements and their functionality, i.e. the way this network segment functions and the roles it undertakes. Furthermore, the components of each these tunnels may change in real time (also, of course, offline between communications or sessions) without impacting the abstraction itself. If needed, the features and capabilities of the tunnel may be updated and reflected to higher networking elements accordingly.

Multiple data routing in these scenarios can be enabled, allocated, provisioned, configured, managed, and disabled quickly and dynamically over time and during operation, and in a scalable and seamless way as with any other conventional networking element and routing. However, underneath the abstraction, there are multiple data route, connection, link or port, abstracted and virtualized from the top managing communication and routing layers, thus seamlessly integrated in a full scale routing and networking infrastructure for managed/unmanaged traffic through public or private networks.

Furthermore, this bonding, thus abstracted, may be used to improve managed services, such as Quality of Service (QoS) for services such as video (contribution, watching distribution, delivery over IP networks), Service Level Agreements (SLA) in managed or unmanaged networks, live video, teleconferencing, telemedicine, and voice over IP in environments of limited resources (e.g., limited bandwidth cellular or DSL connections), uncontrolled resources (e.g. unstable cellular, or other wireless networks, or even Internet connectivity in some countries, where unstable refers to fluctuating network or link parameters (performance characteristics) such as bandwidth, errors, latency, or jitter, in unidirectional or bidirectional data transfer over the connection/link), of enhanced performance (e.g., more bandwidth/throughput or goodput, due to the aggregation). These enhancements to the services may now become dynamic and fully controlled by the virtualization manager considering parameters such as overall need, prioritization of services or users or operators or locations or any other criteria, optimizations, cost issues and cost reduction for the operator, for the user or both, and power saving modes (e.g., optimization for power).

FIG. 1 is a schematic illustration of the communication paths between a first bonding device 110 and a second bonding device 190, in accordance with some embodiments of the present invention. Although FIG. 1 is symmetrical with regard to the communication paths between first bonding device 110 and second bonding device 190, the "symmetrical" elements should not be misinterpreted as mandatory. For example, first bonding device 110 may be using ten modems of networks A, B and C; whereas, second bonding device 190 may be using only two modems of networks A and X (or just a single Internet connection).

A bonding device is a device that uses multiple modems, or IP connections, to carry at least one single data stream. The term "bonding device" also referred to herein as "end-user" or as "end node," includes a device with transmitting capabilities, receiving capabilities, or both. A bonding device may be a dedicated bonding device or a general purpose device running a bonding software, such as a first bonding engine (BE) 118 in first bonding device 110 and a second bonding engine (BE) 196 in second bonding device 190. The bonding engine may be implemented in a smartphone, a tablet, a cellular modem or terminal, a WiFi modem or terminal, a satellite modem or terminal, an MW modem or terminal, a COFDM modem or terminal, a Mifi-sort of device, a chipset running cellular protocols, a computer, a communication device, etc. In some examples the bonding device may be a live media transmitter (e.g., first bonding device 110) configured to simultaneously use multiple modems to broadcast a live media stream. In other examples the bonding device may be a media receiver configured to simultaneously receive from one or more wireless or wired/LAN modems a plurality of data packets and reassemble them to a single coherent media stream.

In some cases, the bonding device may use the multiple modems to simultaneously deliver the media stream. However, the transmission of the media stream may be non-simultaneous or near-simultaneous, because the exact moment that the media stream is relayed (transmitted or received) is not under the bonding software layer control. The exact timing of transmission is controlled by the actual modems and their associated networks. Therefore, the term "simultaneously" indicates that multiple parallel data channels are open for relaying data via different modems at the same time, not that the different modems are necessarily transmitting data at the same time. The actual data transmission may or may not occur at precisely the same time via the different modems.

For the sake of simplicity, the example discussed below assumes that first bonding device 110 communicates a media stream via a plurality of parallel wireless data channels to second bonding device 190. The communication of between the first and second bonding device is bidirectional.

In this example, first bonding device 110 may be a dedicated transmitting unit retrieving from a video camera or external encoder a raw data stream. Second bonding device 190 may be a server serving or belonging to a broadcast company, which reassembles the received separated data streams and outputs a coherent data stream at a destination 199 to be distributed to viewers. The term "raw data stream" refers to any data stream that can be split and delivered via a plurality of parallel wireless data channels. The term "coherent data stream" refers to a group of data packets that together can be comprehended or that resemble the raw data stream before its split. For example, a data stream may be "coherent" if the data was transmitted in the plurality of data streams and then reassembled in a manner it can be comprehended and consumed by non-bonding devices or software awaiting it. In the case of media transmission, the result of this assembly or reconstruction is a coherent media stream (in this example, video and audio) that can be viewed, processed, or otherwise manipulated.

The bonding device can manage the distribution (or receipt) of a plurality of data streams. The term "plurality of data streams" as used herein refers to a plurality of substreams that together make up at least a part of a larger data stream. On the transmitting side, the plurality of data streams may include multiple data packets created from a raw data stream by a bonding device or bonding software. The plurality of data streams may be created discrete from each other and in correlation to the current availability of the plurality of connections or modems or networks associated with the bonding device. On the destination side, the plurality of data streams may be received (in part or in full), and then processed to create a single output data stream at output destination 199. The first bonding device 110 can manage the distribution of a plurality of discrete data streams over the plurality of parallel wireless data channels to transmit substantially any sort of data. The large bandwidth afforded by bonding multiple channels is particularly useful in high-speed or high resolution/quality media streaming.

Destination 199 may include an Internet connection, a LAN connection, a connection to a Firewall, a Router or to any other networking element, a physical port, a video SDI input/output, or an A/V port.

In some embodiments of the present invention, the input data to first bonding device 110 may include any data source whether media data stream, data stored in a server, data from a network, for example. Video camera 103 and laptop 107 as data sources are shown merely for visual clarity and not by way of limitation of the embodiments of the present invention. First bonding device 110 can split any raw one or more input data streams (e.g., a media stream) to a plurality of discrete data streams or packet streams that can be encapsulated according to any IP protocol. For example, the IP protocol may be IPV4, IPV6, a future version, or any mix of them. The encapsulated plurality of data streams may be transmitted over internet 150 to second bonding device 190. Second bonding device 190 may manage the receipt of the plurality of discrete data streams to enable assembly of the media stream, and request retransmissions of missed or erroneously received packets. Although internet 150 is shown in FIG. 1 as a single entity, in practice the network associated with internet 150 typically includes components of multiple interconnected networks.

In some embodiments, first bonding device 110 may receive a raw media stream from a computing device 107 (e.g., laptop, tablet, smartphone, desktop computer or router, etc.) over wireless connection, such as, WiFi, Bluetooth, Wireless USB, Wireless High-Definition Multimedia Interface (WHDMI), Coded Orthogonal Frequency Division Multiplexing (COFDM). Alternatively, first bonding device 110 may receive the raw media stream from a capturing device 103 (e.g., video camera) over a wired connection, such as HDMI connection, serial digital interface (SDI) connection, a standard camera connection, a USB connection, a proprietary connection, an Ethernet connection, a wireless connection, such as Wi-Fi, UWB, or COFDM. In addition, first bonding device 110 may acquire the media stream from one or more sources (e.g., capturing device 103 and/or computing device 107).

In some embodiments, second bonding device 190 may be associated with a virtual bonding receiver that can be co-located next to various network devices (not shown in the figure). For example, the virtual bonding receiver may reside next to or within a base station. Second bonding device 190 (or the virtual bonding receiver) may receive and analyze the data streams originating from modems associated with first bonding device 110. Second bonding device 190 (or the virtual bonding receiver) may take real-time application-level measurements for use in improving or optimizing performance Such optimization may include optimization of the bandwidth and/or other output characteristics of the video encoder feeding first bonding device 110. For example, if a downlink bonded transmission is performed and second bonding device 190 detects that one of the modems associated with first bonding device 110 has a high error rate, second bonding device 190 may report it to first bonding device 110, which may decide to change the distribution of the substreams accordingly.

The bonding device (e.g., first bonding device 110 or second bonding device 190) may be implemented as a single unit that integrates all or some of the modems that it uses. Additionally or alternatively, the bonding device may be connected to any number of modems externally, via wires or wirelessly. As used herein, the term "modem" includes any device capable of transmitting signals (e.g., a transmitter), receiving signals (e.g., a receiver), or both (e.g., a transceiver). A modem may handle at least the communication at the 1st layer (e.g., PHY) and at the 2nd layer (e.g., MAC, RLC). The bonding device may control different types of modems, for example, a cellular modem, a cellular USB "dongle," a satellite terminal, a satellite phone, a cellular smartphone, a cellular tablet, a MiFi Access Point, a Software Defined Radio (SDR) device, a COFDM transceiver, a WiFi module, a cable modem, a proprietary modem, and a processor implementing any of the above. While this disclosure is not limited to any particular modem or communications protocol, embodiments of the disclosure may employ a modem that uses one or more of the following exemplary communication standards: GSM, GPRS, HSPA, Edge, LTE, LTE Advanced, HSPA, CDMA, CDMA Rev A, CDMA Rev B, Wimax, WiFi, Bluetooth, COFDM, Wibro, Satellite BGAN, and satellite VSAT. In addition, embodiments of the disclosure may employ modems that use other known or future wireless protocols.

In some embodiments the bonding device includes a processor. In the embodiment of FIG. 1, for example, first bonding device 110 includes processor 112, and second bonding device 190 includes processor 192 such that the processor runs first 118 and second 196 bonding engines, respectively. The term "processor" as used herein refers to any physical device having an electric circuit that performs a logic operation on an input or inputs. For example, each of processors 112 and 192 may include one or more integrated circuits, microchips, microcontrollers, microprocessors, all or part of a central processing unit (CPU), graphics processing unit (GPU), digital signal processor (DSP), field-programmable gate array (FPGA), or other circuit suitable for executing instructions or performing logic operations. The processors may be configured to communicate with electronic components (e.g., a modem) within the bonding device and to control at least one of the components. In some embodiments, processor 112 and processor 192 may each include multiple processor units.

In some embodiments, instructions executed by processors 112 and 192 may be pre-loaded into a memory unit integrated with or embedded into processors 112 and 192, such as memories 116 and 194, respectively, or stored in a separate memory unit having erasable and/or non-erasable memory banks, such as a RAM, a ROM, or a hard disk. In the alternative, the Instructions executed by processors 112 and 192 may be received from a separate device (e.g., computing device 107). While, for ease of illustration, FIG. 1 illustrates a single processor per bonding device, it should be understood that, consistent with embodiments of the disclosure, functionality may occur in a single processor or may be split among multiple processors.

In some embodiments, processor 112 and processor 192 can control any number of modems, and the number of modems may vary over time. The term "control a number of modems" as used herein refers to any relationship, linkage, or action between at least one processor and the modem(s) (e.g., wireless modems) for facilitating control or a transfer of data. For example, the at least one processor may control a modem if it is enabled to perform a handshake with the modem to enable transmission of data streams, traffic, packets, network-related information, etc. In FIG. 1, processor 112 controls a plurality of first wireless modems, for example, modem A1 123, modem A2 124, modem A3 126, and modem $A_N$ 129. Whereas, processor 192 controls at least one second wireless modem, directly or indirectly, for example, modem B1 183, modem B2 184, modem B3 186, and modem $B_M$ 189. Note that associated with first bonding device 110, there may be N modems and M-modems associated with second bonding device 190 where N and M are integers and not necessarily equal.

In some embodiments the bonding device may include modem managers. For example, first bonding device 110 includes modem managers 115, and second bonding device 190 includes modem managers 195. The modem managers may include hardware, software, or both. The modem managers may manage the transmission or reception of the plurality of data streams over the at least one wireless communications network modem, which may be external to the bonding device itself. The number of modem managers does not have to be the same as the number of actual modems. Therefore, for example, bonding device 110 may include special-purpose, dedicated hardware circuits for channel bonding, or it may perform the bonding functions described herein using standard hardware components under the control of software for this purpose. Bonding device 110 may also use a combination of standard and special-purpose hardware and software components. As discussed above, the bonding device may be a general purpose device (e.g., a smartphone, a tablet) running a bonding software (e.g., a bonding application). In this case the modem manager can be part of the bonding software that performs the functions described herein.

In some embodiments of the present invention, first bonding device 110 can communicate with an Internet server or with second bonding device 190 via a plurality of parallel data channels. The term "data channels" (also referred to herein as "links" or "wireless IP connections") refer to any paths between two components or nodes in which data streams, datagrams, or packets may be relayed (transmitted or received). For example, a smartphone may include a cellular modem and a WiFi modem. In some cases, the WiFi modem may be tethered to another cellular device (e.g., a MiFi or another smartphone acting as a WiFi Access Point). In this case, the two bonded channels may be cellular. In the example illustrated in FIG. 1, each bonding device may control a plurality of modems, so that the communication between the two bonding devices can take place via a plurality of parallel data channels. Specifically, first bonding device 110 may communicate via four data channels, or wireless IP connections, (three wireless data channels 132, 136, and 138, and one wired data channel 134). Second bonding device 190 may also communicate via four data channels (three wireless data channels 172, 176, 178, and one wired data channel 174).

In some embodiments of the present invention, the plurality of parallel data channels may be associated with at least one communications network. The term "communication network" refers to any network enabling two nodes to communicate. The at least one communications network may include any network technology, standard, or network operator used to transmit or receive data between the two nodes. The at least one communications network can include wireline-based networks, such as: xDSL, cable modem, fiber optics, LAN, Ethernet, etc.

In some embodiments of the present invention, the at least one communications network may include one or more wireless networks that can use different technologies and standards. For example, the at least one communications network may include different types of cellular networks (e.g., network 149, network 169) such as: GSM, CDMA, 2G, 2.5G, 3G, 4G, LTE, LTE-Advanced, public safety LTE, and Operator X network; different types of satellite networks (e.g., network 143, network 163) such as: Broadband Global Area Network (BGAN), a Very Small Aperture Terminal (VSAT) Network, a Satcom network, a Satcom-on-the-move (SOTM) network, a Fixed Satellite Services (FSS) network, a Mobile Satellite Services network (MSS), a geostationary-based satellite network, a low Earth Orbits (LEO) network, a Molniya orbits-based satellite network, and any custom/proprietary satellite network; and different types other wireless network (e.g., network 146, network 166), such as: WiFi, Wimax, Wibro, Point-to-Point microwave, proprietary network, COFDM networks, mesh networks, ad-hoc networks, Zigbee, Bluetooth, UWB, NFC and others.

As mentioned above, bonding devices can facilitate a media transmission over at least one wireless communications network. The term "media transmission" includes transmission of any data that may include video or a portion thereof. The data may be received in an digital form (e.g., SDI, HDMI, h.264, h.265, JPEG-2000, AVC, AAC, AC-3, AMR, LPCM, ADPCM, FFmpeg, PDM, ALAC, or others), or in an analog form (e.g., composite, component, RCA, or others). The data may include a live video, a near-live video, or a pre-recorded/processed video. The term "live video" may include a video received from a source (e.g., camera, video recorder, IP video stream) and transmitted with the intention of minimizing delay in the transmission, in accordance with transmission conditions and required performance Thus, a "live" transmission encompasses levels of delay that customarily exist in in live broadcast video transmissions. Customary delays in "live video" may occur as the result of video encoding processing time, a modem internal buffer, internal device processes, network schedule timing, etc. The term "near-live video" refers to a transmission in which the user requirements and/or the network conditions do not allow live transmission. For example, if the transmitting device is in an area of poor coverage.

In some embodiments of the present invention, the abstraction of the bonded network communication as previously described and performed by the virtualization manager is now considered with regard to the exemplary system shown in FIG. 1. In some embodiments, the virtualization manager is typically software code stored in memory and executed by a processor.

A virtualization manager (VM) may be located at any combination of three locations in the exemplary system of FIG. 1. The functions of a virtualization manager 114 are executed by processor 112 located in first bonding device 110. The functions of a virtualization manager 193 are executed by processor 192 located in second bonding device 190. Finally, a virtualization manager 156 may be located in a network component 152 (shown in FIG. 1 as a server) that is connected to internet 150 and may be located for example, in a cloud farm. The functions of VM 156 are executed by a processor 154 and the source code may be stored in a memory 158.

One or more virtualization managers VM may be located at any suitable location in the multiple communication networks. The three locations for VM114, VM193, and VM 156 are shown in FIG. 1 are merely for conceptual clarity and not be way of limitation of the embodiments of the present invention.

The functions performed by the VM are not to be construed per se as those functions being performed by first 118 and second 196 bonding engine if, for example, the VM resides locally as in the case of VM 114 in first bonding device 110.

First 118 and second 196 bonding engines may evaluate network resources based on collected network data over multiple communication networks in which the source data traverses enroute from the source input to the output destination, as well as collected network data over additional networks that the data streams may traverse if rerouting of the data streams are required due to degrading network performance, or other factors requiring a change in routing. The VM does not evaluate network resources only based on collected network data in the network locally where the VM resides. This evaluation may also be based on network data in those networks (e.g., network performance and impairments, for example, through particular network elements) which affect the bonded communication of the source data through the plurality of data streams which transverse the multiple communication networks from source input to destination output, or those networks that may affect bonded communication if rerouting is necessary.

In some embodiments of the present invention, the collected network data may be transmitted to the bonding devices from a network component configured to facilitate a media transmission over at least one wireless communications network. The term "network component" as used herein refers to any element of a network, whether software hardware or any combination thereof, including a dynamic network component or a network component placed within the end-user device. For example, network component 152 may include base stations, gateways, modems, chipsets, communication processors, identity cards (e.g., SIM), and so forth. Network component 152 may manage at least a portion of the traffic passed in the network, or manage at least a portion of the operation of the network. For example, a network component may be an element in a network router, gateway, server, base station, Access Point, RAN node, eNode, RNC, xGSN, xMSC, HLR, VLR, End-User (EU) device, L2 and PHY processor and/or manager, xSIM processor, etc.

Modem managers 115 in first network bonding device 110 and modem managers 195 in second network bonding device 190 are configured to respond to commands from the respective first and second bonding engines. The bonding engines may use commands preset and stored in memory, may be changing the configuration of the bonding groups dynamically with local network conditions, or may receive instructions from the virtualization managers to change the configurations and corresponding bonding groups in response to changing network conditions as described previously above. For example, BE 118 or BE 196 may learn that cellular communication system 169, or any specific/particular IP connection running over it, suddenly experiences low throughput. BE 118 may send a command to change the configuration of second bonding element 190 to disable modem 189 and enable modem 184 so as to route that particular data stream through wireline 174. This management of the bonded communication is not limited to the embodiments shown in FIG. 1.

Figure 2:
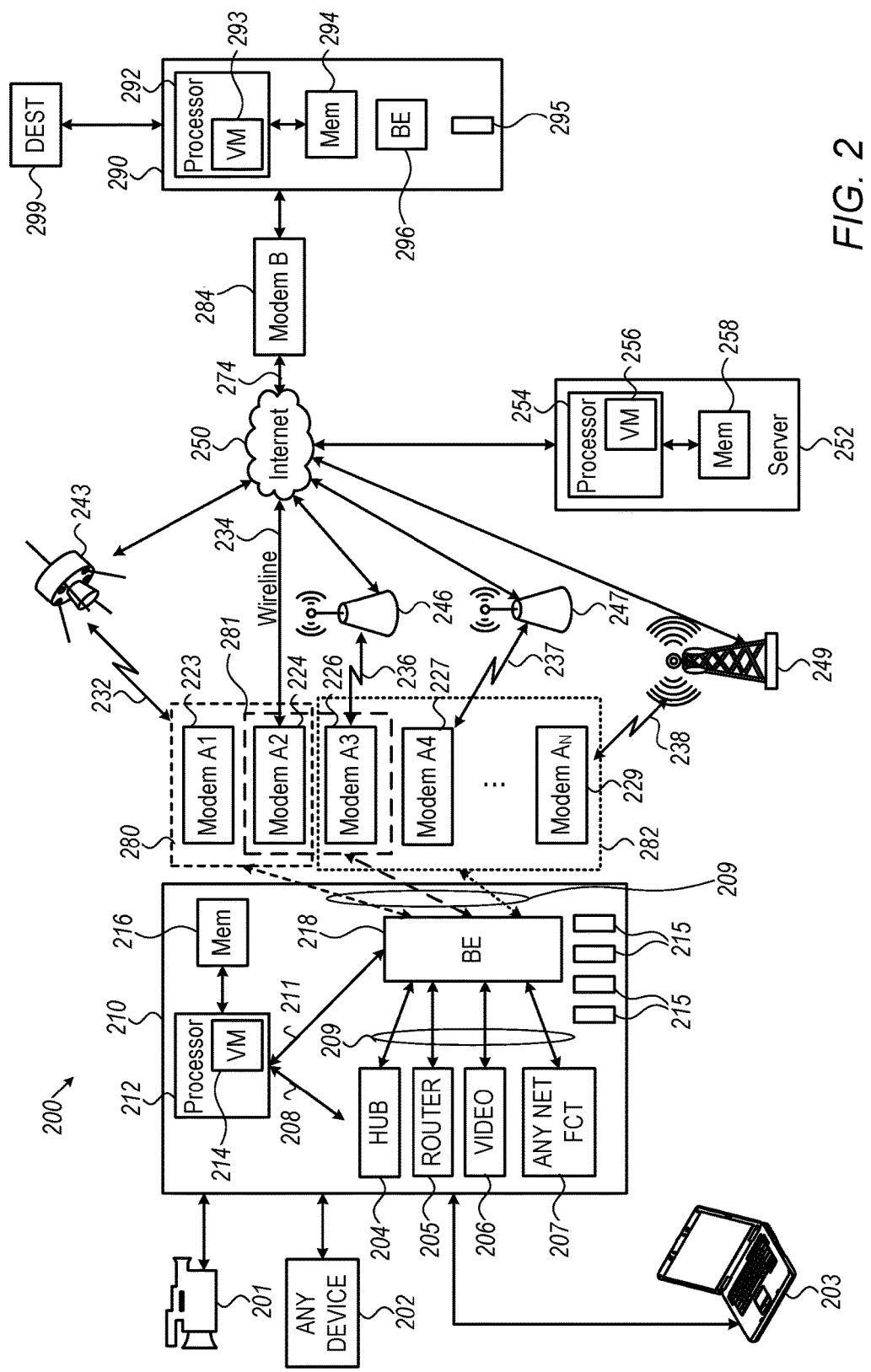
FIG. 2 is a schematic illustration of a system for managing bonded communication using a virtualization manager, in accordance with some embodiments of the present invention.

FIG. 2 is a schematic illustration of a system 200 that manages bonded communication using a virtualization manager, in accordance with some embodiments of the present invention. Input data, created from a video camera 201, a laptop 203, or any input source device 202, is inputted to a network bonding device 210. Bonding device 210 includes a processor 212 that may store data or execute code stored in a memory 216. Processor 212 runs a virtualization manager 214, which controls a bonding engine 218.

In some embodiments of the present invention, VM 214 may instruct bonding engine 218 over a control line 211 to group the modems into bonding groups as explained previously. For example, VM 214 may instruct BE 218 to form a first bonding group 280, which includes a modem A1 223 and a modem A2 224, a second bonding group 281 which includes modem A2 222 and a modem A3 226, and a third bonding group 282 which includes any number of modems defined by integer N e.g., modem A3 226, a modem A4 227, and an modem $A_N$ 229 as well as any number of modems defined in accordance with integer N. Modem managers 215 perform the functions as previously described for FIG. 1. Note in the exemplary embodiment shown in FIG. 2, the modems grouped in respective bonding groups are not mutually exclusive and be shared by different bonding groups.

In FIG. 2, when data is routed to first bonding group 280, BE 218 splits the data, which is communicated to internet 250 over a communication network 232 with a satellite 243 and a wireline 234. Similarly, when data is routed to second bonding group 281, BE 218 splits the data, which is communicated to internet 250 over a Wi-Fi communication network 236 with a Wi-Fi access point 246 and wireline 234. Finally, when data is routed to third bonding group 282, BE 218 splits the data, which is communicated to internet 250 over Wi-Fi communication network 236 with Wi-Fi access point 246, over a second Wi-Fi communication network 237 with a second Wi-Fi access point 247, and over a cellular network 238 using a cellular basestation 249.

In some embodiments of the present invention, VM 214 is also further configured to control, or assign, network functions via a second control line. VM 214 may configure bonding device 210 to behave like a virtual hub and routes the input data from the input data source through a network function hub 204. Similarly, bonding device 210 may be configured to behave like a router and a router network function 205. Bonding device 210 may be configured to stream live video using a video network function 206. Bonding device 210 may be configured to assign any network function 207. In some embodiments of the present invention, VM 214 essentially chooses bonding groups 280, 281, and 282 over control line 211 and assigns network functions 204, 205, 206, and 207 to each of the bonding groups over control line 208. Data is sent from the source to the bonding groups via network functions (204, 205, 206, 207) over data lines 209. The details describing first bonding device 210 with a separation of control lines 208, 211 and data lines 209 as shown in FIG. 2 are also present in first 110 and second 190 bonding devices, although not shown in FIG. 1.

In some embodiments of the present invention, the virtualization manager organizes one or a plurality of network bonding engines to form one or more bonding groups. Stated differently, VM 114 in FIG. 1 may organize bonding engines 118 to form one or more bonding groups from the modems A1 123 to modem $A_N$ 129 and their corresponding IP connections (e.g., connections or channels 132, 134, 136, 138) and bonding engine 196 to form one or more bonding groups from the modems B1 183 to modem $A_M$ 189 and their corresponding wireless IP connections (e.g., channels 172, 174, 176, 178).

In the case of bonded communication system 200 shown in FIG. 2, a second bonding device 290 may be configured as a gateway. Second bonding device 290 includes a processor 292 which stores data or executed commands from code stored in a memory 294. Second bonding device 290 may also include a virtualization manager 293.

A single data stream from internet 250 is coupled to a modem B 284 via a wireline 274, for example. Single modem B 284 is controlled by a single modem manager 295, whose operation is described in detail in FIG. 1. A bonding engine 296 processes the single data stream from the internet 250 as in a gateway and outputs the data to an output destination 299.

In system 200 may also include a remote server 252 deployed in a cloud farm, for example, or any suitable location in the communication network. A processor 254 on server 252, which may store data or run code stored in a memory 258. Remote server 252 may also run a virtualization manager 256. Some of the embodiments shown in FIG. 2 are shown merely for visual and conceptual clarity, and not by way of limitation of the embodiments of the present invention.

In system 200 shown in FIG. 2, first bonding device 210 is configured by VM entity (293, 256, or 214) to act as a "databridge", or a "router" or a "hub", with specific routing protocol or another. A second bonding device 290 is configured by VM entity (293, 256, or 214) to act as a Gateway, serving and communicating with one or more 210 devices or "bonding databridges", belonging to one or more customers, users etc, via one or more ISPs (274), wireless connections (232, 236, 237, 238). Gateway 290 has an IP address to which the packets are sent from 210 in their external encapsulation. Gateway 290 may then decapsulate the packets and forward them to the real destination, represented by an output destination 299, which may be an Intranet, Internet (such as URL or IP addresses or any other addressing method), or physical port (e.g., A/V SDI port) etc. Gateway 290 may also route data packets received from destination 299 and to the devices connected to bonding device 210, or to bonding device 210 itself, via the established connection 274, or to the wireless connections (e.g., 232, 236, 237, and 238) after encapsulating them. Bonding device 210 shall decapsulate the packets, in order to acquire the real and final destination addresses, and forward them accordingly. Any standard networking addressing and routing may be incorporated, such as DHCP, and DNS address resolution functions. In the case where one of the VMs is configured, some of the IP connections and modems associated with bonding device 210 (e.g., the assigned bonding group) and configured to act as a databridge, out of the whole of such connections, may remain static for that session or be changed dynamically within the session. The transmission and reception of the data packets for that databridge networking element shall be communicated over that bonded connection only and the modems/connections associated with the databridge (e.g., the bonding group associated with the databridge). A local DHCP or DNS function or similar arrangement may be done so that gateway 290 identifies this bonded connection and the corresponding bonding group (e.g., modems/connections) as being associated with the databridge, and not the other IP connections or modems in bonding device 210.

In some cases, such as TCP data communication, which might be impacted from changing or long delays over one or more of the wireless connections, a TCP termination on the segment between bonding device 210 and gateway 290 may be enacted and virtualized. In such a case, the devices connected to bonding device 210 (e.g., laptop 203), and the IP networking nodes after gateway 290, may not be aware of the TCP termination. The TCP termination towards laptop 203 shall be handled by bonding device 210, or by one or more of the VM entities (e.g., VM 214, VM 256, and VM 293). Such mechanisms may be used not only for TCP communication, but for any other protocol that may require this, due to potential impact of the performance of a single connection or the bonded connection, or due to any other reason, including encryption over that segment, etc.

In some embodiments of the present invention, first bonding device 210 may include a Databridge IP Bonding mechanism, or technique, for example, as described in the Appendix to U.S. Provisional Patent Application No. 62/047,252, filed Sep. 8, 2014, which is incorporated herein by reference. This bonding mechanism or technique, are also referred to as IP Bonding Protocol. In some embodiments, second bonding device 290 is implemented as a gateway receiving multiple data streams over one port. A software routine stored in second bonding device 290 may be used to reconstruct the data from the multiple data streams.

This technique builds on that protocol by exposing the endpoint (or edge networking device) of the bonded connection as a virtual Layer 2 Ethernet interface to an operating system. The virtual interface appears in addition to the other interfaces that may or may not make up the bond, and adding an interface to one or more virtual interfaces does not necessitate removing them from the list of available interfaces as seen by the operating system.

In a similar way, the bonded connection may be abstracted and virtualized to other protocols and layers, not limited to Layer 2 Ethernet.

A virtual interface can be constructed, or enabled, on-demand as triggered by other protocols or processes on the device, or from across the network from another control point or from centralized control. The virtual interface can also be destroyed, or disabled, on-demand by other protocols or processes, local or remote. An interface can be included in more than one virtual interface and bond at the same time. This allows for the programmatic control of virtual bonding interfaces, and the creation or removal of bonded interfaces based on conditions set by other protocols and processes, static and/or momentary performance parameters and/or reports of, or associated with, each interface, time and date, location, cost, cost/performance, power consumption, desired runtime, desired QoS or SLA, priorities between applications, users, operators, locations or any other criteria, etc.

Virtual interfaces expose information about their condition, the makeup of the bond as programmatically consumable data, or both. This allows the previously mentioned protocols and processes (local or remote) to make decisions about use of a virtual interface as well as construction or destruction of the virtual interface based on internal data about the bond.

The software works by presenting the end point of a Databridge IP Bond as a virtual (non-physical) Ethernet port. Ethernet frames can be transmitted or received via this port as with a physical Ethernet port.

Each such virtual port consists of one or more other interfaces available to the operating system of the device. Each virtual port may have one or more target gateways such that data packet frames are forwarded to and that transmit frames to this virtual port. In addition, each virtual interface may have specific bonding parameters and properties such as link-grading health thresholds, redundant forwarding tactics, and protocol acceleration properties.

Creation of an interface can be invoked via a trigger to the operating system, to the software present that implements the Databridge IP Bonding, or both. For example, a trigger can be delivered via: an SNMP message to a listening SNMP port on an existing interface, an API call via a TCP packet sent to a listening API entry point on an existing interface, a signal sent to a process ID, direct invocation of a function exposed by an Executable and Linkable Format file (ELF), LACP packets read from the LACP multicast range, by signals sent to network-offload hardware, or via remote signal in a OpenFlow or other Software-Defined Networking environment.

A creation request may include the following data about the requested bridge: which other interfaces to include in the bond (either directly or by using some ID, such as Bonded-Group-ID, to identify that bond, the participating connections or links, or both, as well as real devices such as network interfaces), one or more gateways in which to link (with multiple gateways used for redundancy, or for multicast), specified by IPv4 or IPv6 addresses, as well as TCP port, UDP port, or any other port numbers, if the bond should be low-latency with high resiliency (as specified by each underlying bonding device which is thus abstracted), and specific components of link health grading if options, other than defaults are desired. The options for link health grading including acceptable level of packet loss, acceptable delay, and acceptable minimum effective bandwidth.

Because different parameters can be specified at creation-time, other processes and protocols can create virtual interfaces conforming to protocol or application specific needs. Examples would include an OSI Layer 3-7 protocol needing a low-latency, but redundant connection, whereas an application (typically operating at Layer 7) needs a high-bandwidth connection that can allow for higher latency. Both applications can construct virtual interfaces as needed, possibly from the same set of member interfaces, constructed with different parameters. Once those protocols or applications finish transferring data across the interfaces, they can close, or destroy, the virtual interface until the interface is needed again.

Once the interface is created, the operating system can send Ethernet frames to this virtual interface, and may receive Ethernet frames from the other side of the bridge. The internal state of the bond may be governed by each abstracted underlying bonding devices, and information on the current state of the bond, as well as aggregate data about the bond since the bond was created, will be available programmatically.

Data about the internal state of the bond as well as aggregate data since the creation of the bond are available from the each of the abstracted underlying bonding devices. This can be accessed for a specific virtual port via SNMP packets sent to a listening SNMP port on an existing interface, ICMP packets sent to the virtual interface, an API request sent via TCP to a listening port on an existing interface, a signal sent to a process ID, direct invocation of functions exposed by a Executable and Linkable Format file (ELF), or by a signal sent to network-offload hardware.

Creation, destruction, and information querying of the virtual ports (control plane) can take place via mechanisms unrelated to the resultant virtual ports (data plane). Signaling for the construction, destruction or querying of a virtual port can be made to a different process, operating system or device remote from the location of the virtual port itself. This allows implementation of the data plane to address its own concerns such as hardware acceleration or virtualization, while allowing implementation of the control pane so as to also address specific concerns, such as control from a centralized point or virtualization.

Many virtual ports can be created, consisting of one or more of the other interfaces available to the operating system. An interface may participate in more than one virtual interface. The interfaces used need not be physical interfaces, so long as the interface conforms to the needs of each abstracted underlying bonding devices. The interfaces may themselves be bonded interfaces that implement other bonding protocols and techniques, as long as the interfaces conform to the needs of the each abstracted underlying bonding devices.

Other processes and protocols can destroy interfaces on-demand. This can be done to free up resources in the operating system, when the virtual interface is no longer needed. The same methods outlined under creation of a virtual interface can be used to destroy a virtual interface.

Interfaces remain available to the OS even when participating in one or more virtual interfaces. Those interfaces can still route traffic as they normally would, while traffic from each of the abstracted underlying bonding devices is also routed over the interface.

This holistic technique differs from other tunneling mechanisms because the tunnel linking the two end-points is a bonded connection routed over multiple other interfaces available to the operating system.

This holistic technique differs from other link aggregation techniques because interfaces can participate in more than one bond, and can still be used as individual interfaces. Links in the bond can be multi-segment, routed links. In addition, links can be graded based on specific conditions outlined by each abstracted underlying bonding device protocols. Individual virtual ports can have different properties for assessing link grading and health.

In some embodiments of the present invention, presets may be used. Presets of certain connections, links, or actual networking, edge or connectivity devices (such as networking interfaces), are pre-configured, allocated or provisioned, in certain connectivity groups. Presets, links, or network interfaces, or other devices or entities may be managed, assigned or switched either locally, or by a remote center or unit. Initially, a trigger may initiate a bonding. In a second step, a first bonding device in a first network is provided with data (e.g., a first configuration) required for creating a bond. In the third step, the first bonding device in the first network sends a bonding message to a second bonding device in a second network. In a fourth step, the second bonding device creates a bond group based on the bonding message (e.g., a second configuration). The second bonding device may choose to also use a second preset configuration in response to the bonding message. Finally, a bond may be destroyed using similar means and receipt of relevant messages, changing the first or second configurations for creating or destroying bond groups in the respective first and second bonding devices.

Figure 3:
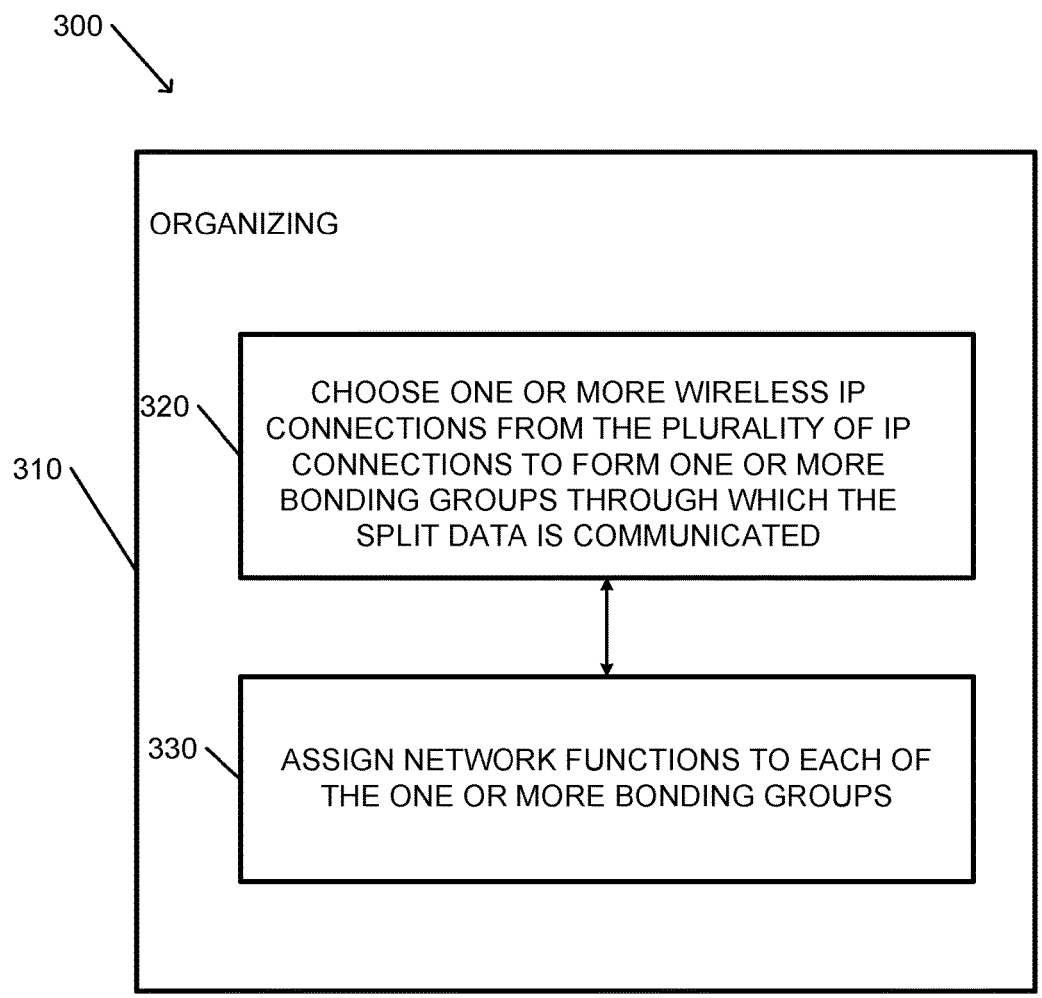
FIG. 3 illustrates a method for using a processor to manage a virtualization of a network bonding connection, in accordance with some embodiments of the present invention.

FIG. 3 illustrates a method 300 for using a processor to manage a virtualization of a network bonding connection, in accordance with some embodiments of the present invention. Method 300 describes functions performed by the virtualization manager. Method 300 includes organizing 310 one or a plurality of network bonding engines, each of the network bonding engines configured to split input data from at least one input data source into a plurality of data streams communicated over a plurality of wireless IP connections of different performance characteristics, or to reassemble the input data from said plurality of data streams. The plurality of the wireless IP connections, or data channels, may be of the same type such as cellular or Wi-Fi, etc., may be different, or a combination of the both. The different performance characteristics of the wireless IP connections may include the following metrics: link throughput, link goodput, link temporal jitter, link latency, quality of service, bandwidth, wireless technology (e.g., cellular, satellite, Wi-Fi, etc.), error correction method, chosen basestation, data package and volume, service level agreement (SLA), service type (e.g., live video streaming, web surfing, and Internet of Things), different IP routing, different cellular operators (for example, T-Mobile vs. Vodafone), channel capacity, and area coverage.

Organizing 310 of the one or a plurality of network bonding engines in method 300 includes choosing 320 one or more wireless IP connections from the plurality of wireless IP connections to form one or more bonding groups through which the split data is communicated. The bonding groups do not need to be mutually exclusive of IP connections (modems). For example, bonding group 280 and bonding group 281 both include modem A2 224. "Choosing" in the context of the present specification, relates to actually performing the action of choosing or causing another virtualization manager or bonding engine to perform the action of choosing. Causing another virtualization manager or bonding engine to perform the action of choosing, may include, for example, defining and informing this other entity one of: desired or minimal performance parameters, such as, quality of service, SLA, constraints, IP routing, and/or associating these with any specific applications or specific users, etc.

For example, the virtualization manager may inform a bonding engine to form a bonding group that has an uplink operating at a rate of at least 10 mbps and a downlink operating at a rate of 3 mbps (on average over X seconds, as published by its technologies, or when measures in any other way), maximum of 0.5 sec of uplink latency and 0.3 sec of downlink latency (end-to-end, or over the wireless sections or in any other way measured), having X % error rate or Y % packet loss over time end-to-end over the full IP connection or in any other way measured, and associate it with a video transmitting function, whereas another bonding group may have other parameters and function as a bonding databridge in the same bonding device.

Organizing 310 of the one or a plurality of network bonding engines in method 300 includes assigning 330 network functions to each of the one or more bonding groups.

In some embodiments of the present invention, creating and destroying groups, sets or bonds may be done by a local or a remote virtualization manager. The virtualization manager evaluates all sorts of information about the network resources. The groups, or sets, may each have an identifying Bonded-Group-ID. Each group (or set) may have its own characteristics, such as expected throughput, bandwidth, error rate, latency, TCP performance, UDP performance, ARP performance, clock synchronization performance, and cost metrics (e.g., cost per traffic (bytes), cost per time, fixed costs, setup costs, or other cost metrics), power consumption (such as when using more or less modems, or using specific modems, or networks, or modems momentarily remote from BTS towers such as those working on network A vs momentarily closer to BTS tower such as those operating Y), or optimizing and planning for a specific run-time period (or session, or transmission, etc.) when factoring in all power consuming components such as may include the modems of the IP connections or any other component or processing rate (such as slowing down the processor performing the desired networking element), or any other characteristics at certain conditions, as a collective single virtualized networking element. The conditions when to use, thresholds, applications, priorities, owner, allowed users, allowed IP traffic destinations, or IP traffic sources, may also be defined for the groups, in a specific, hysteresis, or any other method.

Additional characteristics may also be associated with each group. The groups may be changed, allocated or provisioned, in real time by the remote networking management element, or locally by the edge-device or any other allowed networking element in-between. This change between groups, or change in the group elements (such as adding/removing an element into/from a group), can be done according to any criteria associated with the virtualized bonded connection, or other criteria such as application or applications need(s), desired performance, cost, preferences or priorities, power consumption, desired run time etc.

In one example, a certain bonding group may be used when a live video application uses bonded connections, which demand a certain level of QoS (e.g. certain bandwidth, error rate, stability, etc.) or SLA (including availability, up time or run time, goodput, secured connection such as via VPN, etc), and a different bonded group may be used, or allocated or provisioned, at idle time, yet another bonded group may be used or allocated or provisioned for non-video web-surfing. In this way a remote location may be served in the best possible way disregarding traditional limitations such as being served by a single IP connection (or network interface), being served by a single operator (such as a single cellular operator), single ISP (since each cellular or WiFi or SATCOM operator may be connected via a different ISP, or the virtualization manager may dynamically route packets between any of the multiple connections/network interfaces of the remote unit through any ISP) or technology. In this way, the optimal service may be achieved as well as optimizing a network or multiple networks. For example, network interfaces which are at that point in time slowest, may be commanded by the virtualization manager or by the bonding device to serve certain high-latency applications, such as web surfing or occasional IoT connectivity. Other bonded network interfaces, or bonding groups, may be thus requested and configured in the remote bonding device to serve high throughput ultra low latency applications, such as Augmented Reality related etc.

In some embodiments of the present invention, the change between the bonding groups may be triggered, executed from/by a remote virtualization manager (implemented in software, or alternately in hardware), or locally in the bonding device by a bonding engine installed on the bonding device which can control the configuration of the bonding group locally, or a combination of the virtualization manager working with the bonding engine.

Furthermore, billing, accounting, predictable traffic performance and management, overall network management, provisioning, and performance prediction, allocation to other devices and connections may all be performed more optimally, as the bonding groups (pre-defined, or ad-hoc created), provide this level of abstraction without going into the resolution of the relative performance, or other characteristics of each of the bonding groups elements separately.

The virtualization manager may perform network management level algorithms, either remotely or locally on same device, may be employed to utilize these bonding groups (or sets), change the bonding groups by changing the bonding device configuration, optimize overall or local network performance, so as to provide transparency and assimilation within the network, according to various parameters, criteria, network requirements, and other information about the network resources.

Learning and adapting multiple bonding device configurations for later decisions may also be used. Managed services and managed networks may thus also be used when matching certain applications and desired performances with certain connections or groups. The provider of the bonding device or connectivity service can decide which links, network interface, operators, technologies that can be used at any given time while the group Bonded-Group-ID or other identifications or credentials remain the same for the upper networking elements and algorithms (e.g., the virtualization manager), thus separating the actual bonding implementation or deployment from the network operators or elements. Such decisions as to which modems, or IP connections, to use may thus be made by the bonding device associated with the field device or in conjunction with the bonding device associated with the Gateway according to the target parameters or function commanded by other entities via the virtualization manager. The virtualization manager may instruct a specific bonding field unit to associate a certain application running on it, for example a video transmission or a data bridge, with specific target performance, such as up to X mbps and Y msec latency or Z error rate for the live video transmission, and T parameters, such as perhaps bitrate and power consumption targets, for the data bridging function. Then the bonding engine/entity may select the appropriate modems or IP connections for each bonding group at each point in time independently and transparently to any virtualization managers in the network, or the bonding devices may report the selection to the virtualization manager. The VM decides the networking function and desired SLA/performance/functionality, and the bonding engine decides how to construct the bonded connection accordingly, which modems/networks/IP connections to include or not accordingly. Of course this job of the bonding engine may be done by the VM, and then the bonding engine shall receive an instruction with which modems to work for each networking functionality at each point in time etc.

Hence, the networking elements and operators manage the traffic and performance, and bonding groups, but not necessarily each bonding connection, link, network interface, or device. The overall performance of the bonding device, or of several bonding devices that may even not belong to the same user, and therefore, not necessarily coordinated by the management system of the same user, or the network infrastructure resources such as cellular base transceiver stations, WiFi networks. The transmission of the multiple data streams through these networks can be optimized with minimal traffic and overhead communication flow between the bonding devices as well as local or remote virtualization managers.

A link, channel, network interface, or other such abstracted bonding resource may be transferred in real time from one bonding group to another. In that case, bonding device configurations are stored in a database (such as presets) and may be updated in real time as needed. Changes made to the above-mentioned groups, access connectivity or services may be done in real time at the bonding device level (e.g., bonding engine) via the abstraction and virtualization protocols manage the distribution of the data streams through the bonding groups by change the configuration of the bonding devices (e.g., bonding groups) as instructed by the virtualization manager. By using a separate plane for control and data as in some of the embodiments of the present invention, a system may dynamically add a network interface to a group or remove the network interface from a group. For example, managing the bonding groups or sets may be according to optimizing network resource, or performance, characteristics such as cost, cost/performance, power consumption, desired run time, usage type, priorities, traffic types, applications, users, routes or paths, etc.

In some embodiments of the present invention, each group of IP connections, or network interfaces (such as from several cellular, or WiFi operators, or operating on the network of same operator, etc.) in each direction (e.g., uplink or downlink) of each remote field unit, may be instructed to change networking functionality accordingly. For example, two cellular network interfaces in field unit A may be instructed to act as a bonded broadband wireless router in both the uplink and downlink also assessing a WiFi hotspot for certain (or all) computing devices in its vicinity, whereas another three cellular network interfaces (and their IP connection to the cloud, or other bonding server) may be commanded to act as a bonded video transmitter for camera connected to the field unit, whereas another two network interfaces may be commanded to be bonded together to act as a bonded bridge network device for specific LAN IP addresses (and specific data traffic types, such as UDP or TCP or HTTP etc).

In some embodiments of the present invention, data protection and data security requirements may also be handled in this abstracting and virtualizing way (e.g., by the virtualization manager). For example, for certain applications a VPN, IPSec, or other cryptographic algorithms or method may be required. Yet for other applications, using the same bonding device(s), other methods should be used, at the same time or at different times. The virtualization manager may forward the security requirements, protocols, parameters, tunnel IDs, application with bonding connection association, and Bonded-Group-IDs between bonding device (or element or software) and the specific networking element implementing the security algorithm. The algorithms may be implemented at the relevant remote and/or local networking element, with or without the participation of the bonding element, may thus decide on the proper security or data protection (or any other scheme overlaid on the traffic or routing requirements for the traffic), assign bonding elements or groups in a seamless transparent way (i.e. without knowing how it is implemented underneath), or just relay the information in full. Alternatively, the virtualization manager may just relay the requirements with any required parameter such as encryption keys or VPN ID or ports between the bonding element and the network element performing the encryption or decryption as needed. Similarly, some traffic may then be routed via private bonded groups or public ones, partially split between such encryption networks or connections. The actual connections used shall be abstracted and transparent to the networking routing elements, such that the virtualization manager will inform the bonding engine of the desired characteristics, so to locally select a bonding group from the database based on that characteristics and the pre-defined configurations of these bonding groups.

In the above description of secure connections, the relationships between one bonding side and the other bonding side may also be termed as a "trust domain" as used in SDN architecture terminology architecture as referred to in the reference entitled "SDN Architecture", Open Network Foundation, Issue 1, June, 2014. The SDN interface with the bonding device may be considered as part of the "southbound interface" to the SDN controller as in the reference.

Furthermore, in relation to the same SDN model, an SDN controller may be implemented locally at the bonding device. In this manner, the SDN controller may control the functionalities of the underlying bonding elements, links, connections, device (or multiple separate devices), QoS, routing various traffic types. It can then communicate with other SDN controllers and or SDN or other network management function (OSS), update of bonding groups changes, of performance changes, of availability, etc. The databases for storing the collected information regarding the network resources also include the features and capabilities of the bonding elements, groups, or both may be referred to or considered as an Resource Data Base (RDB), whether centralized in a virtualization manager, distributed over multiple virtualization managers, or locally at the bonding device.

In some embodiments of the present invention, whereas according to the common-practice bonding mechanism as explained above, there are two bonding elements in the two sides of a connection, this abstraction allows the networking side to reside within the networking trust domain of any 3rd party, not the bonding service provider itself, and be managed and controlled from remote and as part of the overall networks.

A number of control units, such a server 152, or bonding servers, such as a bonding server replacing second bonding device 190 may be respectively used (e.g., in system 100 in place of the first 110 and second 190 bonding devices) enabling control separation between network providers as well as using multiple control units or bonding servers. Each bonding server or control unit may serve all bonding elements in the network in which they are deployed and may further communicate with other bonding servers in other networks over different paths in the network. Accordingly, bonded network communications may spread over multiple networks. In some embodiments of the present invention, bonding servers including virtualization managers collecting network data about network resources, may monitor the links, and send control information to devices. For example, reassembling forwarded streams of data packets may be done remotely at devices such as network interface or gateways, not in the local control server, after receiving instructions from the virtualization manager (remote or local).

For example, such bonding service points may be located in a cloud farm, as well as on the premises of a cellular operator cable operator. Furthermore, a bonding service point may be split between more than a single location. For example, one bonding service point may be located at a cellular operator C1, another one at cellular operator C2, a 3rd one in cable operator O1, another one at a satellite teleport P1, etc. Each such interim or intermediary bonding service point may provide bonding termination points for one or more bonding edge devices, links or channels or Networking Interfaces, from same or different device owners, or bonding service providers, or vendors, or access users.

In some embodiments of the present invention, the first and second bonding devices of FIG. 1 may be replaced by several bonding servers or service points residing in several networks of several network operators. Cellular, satellite and cable may be supported by a single system. As shown, virtualization managers located at different points in the system may communicate with each other in order to enable and support cross network bonding.

Split service bonding points/elements may be linked together in a virtual abstracted way. Data may travel through each of them when routed and controlled from standard network elements and functions according to the relevant destinations of each bonded link/device/application, so that at the end, the packets shall be aggregated at the relevant IP destination from all relevant bonding service points, re-routing is done according to real time performances of each link as decided either in the bonding service point or remotely by a remote bonding management element, or a remote network element. Furthermore, in such a way several links from the same operator or different ones, may be reassembled and united in such split nodes in the network, and then pushed forward to their next hop, or final destination, using any appropriate protocol or policy. This allows better utilization of network resources, fixing problems earlier in the network rather than later (rather than from the two end-points as is the current practice). re-routing, QoS enhancement to overall bonding performance.

In some embodiments of the present invention, such interim bonding service points may also serve as routing gateways, facilitating multicasting to multiple end-bonding devices. Many times the bonding edge nodes communicate with each other exchanging information about the momentary performance of each of the links, so they can select which ones to use and in what way/how much etc. Therefore, this requires end-to-end measurements and communications. Using the interim bonding service points as explained herein provides one method for broadcasting the information to multiple end points. The interim service point terminates the communication towards each of the edge bonding points, on one or more of the links, communicating with them as needed. Thus the measurement and exchanged information represent the segments/hops, or can be further aggregated to represent or describe a whole section with of multi-hops, each hop/segment may be include different links. Network interfaces, network providers/operators or technologies. Using NFV protocols, or other network management protocols, the interim elements are abstracted, the information is exchanged seamlessly. Furthermore, via these standard protocols re-routing, changes to the routing, changes to the bonding aggregation, buffering, network information or measurement or other bonding related behavior may be exchanged and controlled in real time or offline. This could also be done for edge bonding points or central bonding points. Such that a multicasting, or single-casting, or any other instruction, may be changed in real time by commanding any of the bonding elements.

In some embodiments of the present invention, the information and instructions may be collected from, one or more networks and networks providers similarly to the way other network-related, or routing-related information travels, thus impacting all relevant bonding nodes.

In some embodiments of the present invention, each of the involved bonding elements, the edge elements, the infrastructure or central elements, or any interim one residing in one of the network providers, may provide to the network management feedback, performance statistics, link performance measurements, traffic performance reports, traffic type performance reports, momentary alerts resulting from poor performance or failures in the routing or in the equipment itself, etc. Feedback from a device in a first network may be provided to a virtualization manager in a second network. Feedback may include reports, alerts and notifications that may be communicated between bonding elements, devices or software and network management elements, e.g., a control unit or bonding server.

Reports may be used by the virtualization manager for billing (such as providing alerts discounts when the desired SLA or QoS are not met), selection of the right combination of links, technologies and operators to be used by each bonding node according to the reports, and reports from other nodes or other network information and resources (such as cost information, power consumption information, other agreements, traffic predictions, etc), scaling the bonding access deployments to hundreds of thousands or more for any single network operator.

In some embodiments of the present invention, an SLA, QoS or other network data coming from the network may be used by the virtualization manager in the bonding device, element, software, several of them coordinated, from one operator, or multiple operators serving the same overall connection at one point in time, to select and change in real time any of their resources or usage patterns so as to optimize the transmitted data. This may include selecting, deselecting, initiating or terminating, loading to a certain extent with certain traffic type or application or packet types or protocol types, any specific network interface, link, or route so that the routing over the whole network is optimized by the virtualization manager and the delivery of data traffic best matches the network requirements.

In some embodiments of the present invention, the virtualization manager may change the destination of packets according to any of mentioned parameters, in real time according to the above-mentioned criteria. This creates dynamic bonding, allowing any portion of the traffic, sub-streams and even specific packets to be routed over the bonded connection to one destination, other packets sent to another destination, same packets sent to multiple destination using standard network protocols and mechanisms (e.g. multicast), using IP address masks rather than specific addresses, creating multiple tunnels and different security protocols using the same or different underlying bonding resources, such as the network interfaces or links participating in one or more bonding groups, bonding connections, bonded routes, or bonded services. The bonded session can thus be created with relevant parameters, to one or more destinations with any bonding terminating element in the middle of one or more networks or links (e.g., an interim or intermediate bonding element).

In some embodiments of the present invention, when the bonding element is deployed in the cloud, it can serve multiple different LANs, subnets, masks, VPNs, topologies, WANs, and hence multiple different customers and user types, authentications and data protection schemes, QoS and SLAs. A single device may run several instances of the bonding element, or multiple co-located or remotely-located devices may run them. Each instance may be configured so belong to, or to manage, or to be the router of, a different LAN masks (level 2 data bridge). These tasks may be further managed from remote using a virtualization manager.

For example, when more bonding instances, devices or services are required in a certain LAN, more computing resources in the cloud, or IP addresses, stronger networking resources are needed, such as stronger routers capable of handling more traffic as the bandwidth, access demand by any single or multiple bonding devices may rise (or change), may be dynamically allocated, provisioned, configured to any specific LAN or subnet, or multiple LANs in order to optimize the traffic through a specific single or multiple bonding devices, in terms of computing or networking resources utilization, cost, response time, power consumption (of any or all involved elements). This could further be done automatically when identifying the rise in the demand, either a short-term demand or a long-term, more stable increase in demand Different provisioning may then be done to optimally support each case. As previously described, the identification of these scenarios, and raw parameters pertaining to bonding, to performance of links/connections, of applications (e.g. current video stream goodput), are relayed to the virtualization manager via this abstraction layer. The virtualization manager collects network data on available or potentially available network resources, such as bonding links (and their performances and expected performances), gateways, intermediate bonding elements, general network routes, routers, LANs, addresses, masks, subnets, network providers and their types, are all transparent and factored into the decision algorithms running in the virtualization manager for optimally allocating bonding and network resources (e.g. computing or network resources in the cloud and/or on premise), provisioning, de-allocating, configuring, grouping, and degrouping. Similarly, re-allocation, disassembly of LANs, de-allocation of IP addresses, de-allocation of computing resources, or de-allocation of connectivity resources or de-allocating or re-arrangement of networking topologies and resources may be provisioned and configured in real time or near real time, even from remote by one or more virtualization managers.

In some embodiments of the present invention, cloud resources such as servers, IP connections, CDNs, video transcoders (such as multi-rate transcoders or others) that can run either on dedicated HW or on general purpose hardware or on servers, routers, are set-up, provisioned, changed and torn-down as needed for the delivering the live video to various multiple destinations, such as multiple sites (studios, Master Control Rooms—MCRs) or destinations which serve video outlets and publishers, such as websites, social network pages (eg. Facebook, Twitter, Snapchat, or Youtube). The video server or the management server may command or request changes in these resources from virtualization managers deployed locally or remote according to the changing needs, such as the level of required transmissions, user-selected or automatic changes in the destinations of the live transmissions from the field or automatically, such as a result of certain policies, conditions, performance parameters, changes in the performance parameters, such as better or worse video-transmission conditions over any single or multiple wireless connections out of the multiple connections, that may be used by any single transmitter, mobility of the transmitter from one location to another during the transmission (or before or after transmission).

The changes in the resources create a self-organizing video or data network, depending only on the destinations rather than on the nodes in the middle. For example, if the user selects the destination of a certain transmission to be both an MCR and his Facebook account, then the network shall automatically route and instruct all interim nodes so that delivery to those multiple destinations are executed.

In some embodiments of the present invention, if one user is using a multi-connection IP gateway in the cloud, and more users start to use this gateway, then a virtualization manager may instruct different network resources to add another gateway for the necessary period. When the overall traffic or traffic-processing power decreases, the virtualization manager deployed on a server, or deployed remotely, may order the first or second gateway to be removed, thus reducing costs, or alternatively reducing power consumption and increasing run time.

In some embodiments of the present invention, the cloud, or other gateway server, may route some of the traffic via specific IP connections, or links, to or from the remote field unit that uses the multiple wireless connections, or network interfaces, or technologies (such as LTE, LTE-A, 3G, WiFi, SATCOM etc) or operators (such as Operator A, Operator B) or any combination thereof. The change in the traffic being routed over each of the connections, in each direction (e.g., to/from the gateway, or to/from the remote field unit) may be commanded by the gateway itself, or by a local or remote virtualization manager. For example, if there are many remote units in the same locations, using the same network resources (such as network access points, base transceiver stations, or sectors), then the virtualization manager may detect this and instruct the gateway or any of the co-located remote units to increase or decrease traffic over the connections (or wireless Network interfaces).

For example, the virtualization manager may divert some of the traffic for a portion of the units during a specific time interval to a specific WiFi access point, for example, operated by a particular WiFi operator A, which may also be the operator of a certain cellular network also being used by that or other multi-connection remote unit. In this manner, the software-defined network adapts to the changing conditions in the remote locations, reflected in changes in the routing of at least some of the packets. If this is done within the session, the gateway, remote or local virtualization manager ensure that the change in routing is done transparently and without interruption, loss of service, or other degradation to both service and other IP nodes along the routing of the packets from their source input to their output destination. The gateway, remote or local virtualization manager to manage accounting and billing accordingly to the changed routing. For example, a certain connection (or cellular network interface) may be associated with a certain data package, usage limitations, caps and SLAs. The WiFi connection for that same user, for example, belonging to the same operator as that of the cellular connection, may be associated with other data packages, SLAs, limitations and caps. The virtualization manager may decide to offload at least some of the data at one point in time or another, at one location or another, or at one transmission performance threshold or another, from the cellular to the WiFi, completely or in part, and back to the cellular connection, or more than one such connection. The actual usage and packets being communicated over each of the links, connections, or network interfaces is monitored, so that the correct accounting and billing shall be made, and without any impact to the service.

In some embodiments of the present invention, when allowing such gateway to reside in the cloud, handling the routing of IP traffic in various layers such as OSI communication layers 2-7, and modifying the resources according to temporary or predicted traffic to and from the remote field unit or units over the multiple connections (or the wireless network interfaces), it is possible to utilize standard CPUs in standard servers and computers rather than traditional special processors especially designed for routing or protocol handling, such as existing in the traditional routers. In that the virtualization manager or the gateway itself may configure in advance the real time standard CPU resources in any cloud and cloud operator, and dynamically route the packets from the multiple connections of the remote field unit.

In some embodiments of the present invention, a bonding device may become mobile, first serving access in area A1 and then moved to serve traffic in area A2, sometimes even in completely different countries using different cellular, satellite, WiFi. DSL/cable or other network providers or operators. Remote provisioning of the bonding element gateway may be implemented at one time to be located in a cloud farm or other facility, single or multiple gateways. in area A1, or geographically close to it, or otherwise whose network elements are optimized shorter delay time, lower error rate, higher bandwidth or goodput, lower cost, lower power consumption (momentary or permanently, for one or more involved elements or devices) for area A1. At least some of these parameters of the bonding devices and elements are reported to a virtualization manager. Then, the bonding device may be moved to area A2 and automatically (or manually) served by a bonding gateway or gateways better suited to its new geo-location, according to any combination of the mentioned parameters. The change in the geo-location may also be reported by any of the bonding devices or elements, by an interim unrelated operator such as the cellular operator of the SIM card operated by him, by GPS applications or other geo-location applications installed, and by deducing such a change from analyzing the routing hops and addresses. Then, the virtualization manager may allocate, provision or configure another bonding gateway or bonding elements, including intermediate elements in different cellular or networking operators premises or networks, to better or more optimally serving the bonding device in its new location.

If the device is moving, for example, on a fast-moving train (e.g., bullet trains), from region to region, or from country to country, the virtualization manager identifies geo-location change and movements, and the networks and routes serving those regions, and then executes re-provisioning of the bonding resources, routes, gateways, networks etc, in real time or near real time so as to serve such mobility.

In some embodiments of the present invention, when bonding two satellites, for example by a ship, the identification of a change of service level by any one satellite provider, for example, due to moving through different satellite coverage areas or due to weather issues, may be reported via the abstraction layer (e.g., virtualization manager) and then bonding or other network resource may be re-provisioned or allocated accordingly.

Similarly, in another example, if a terrestrial area becomes congested or poorly served by any one of the cellular operators available to a bonding device, then the performance and parameters may be reported via the abstraction layer by any of the involved bonding elements, and re-provisioning of the bonding elements, remote allocation of SIMs, or other networking resources, such as applying for additional cellular network resources, BTS resources or other resources, may be executed automatically or manually by the management layer (e.g., via the virtualization manager).

In another example, routing for specific traffic may be provisioned by communicating with any network device or element, such as router, switch, DHCP server, NAT servers, security or authentication gateway, Firewall, SDN element or NFV element. For example, a DHCP, a NAT server or firewall or router may be commanded to change their configuration, to perform relevant port forwarding according to IP address destination and/or origin allocated to any bonding link or bonding element gateway or element according to the changing bonding performance and desired performance as explained above. This also provides a huge advantage for temporary usage where a trusted management element instructs network elements (such as the DHCP NAT or firewalls) to allow access for a specific bonding links or patterns, for a specific duration, or schedule. Bonding traffic may have its own IDs, also provisioned in real time or near real time or in advance using the abstraction layer and the management algorithms, which make it recognizable to the networking elements on the way, thus also provisioned in correlation.

In some embodiments of the present invention, more bonding related functions may be distributed between different entities or layers. For example, load balancing, or the distribution of traffic or packets (specific or non-specific), may be done either by the internal bonding elements or device, or by higher communication layers, such as a router, or by both. The relevant parameters, performance, and desired performance may be communicated between the two using the abstraction layer, allowing such inter-layer and inter-device transparent cooperation. Algorithms split the load balancing function, or coordinate bonding according to higher-layer performed load balancing, which can then be used by the local or remote network virtualization manager.

This upper layer load balancing management entity may have different set of criteria and decision algorithms for splitting the traffic between networks, links, and operators (e.g., cost, or knowledge of congestion in certain parts of the networks), leaving tune up, or no load balancing at all, or bonding-optimized load balancing within certain constraints, such as using the network interfaces of the same operator for a specific traffic, of the load balancing for the lower-layer bonding layer itself. Thus, for example, congestion may be avoided by the networking management function that receives the abstracted information (e.g., the virtualization manager) and decides on various load balancing, packets routing, traffic limitations, and priorities, according to the available network interfaces, connections, wireless technologies, based on the instantaneous or predicted performance of the traffic demands by the applications being served, such as for example, congestion in either a specific wireless network, networking route, or of a whole area served by multiple wireless operators, BTSs, and nodes.

In some embodiments of the present invention, another exemplary implementation might include a control server which manages application-specific needs across a wide-area network, that includes physical links as well as backup cellular wireless links, via software-defined networking. A definition in the control server defines that once-daily, a two-way video call requires low-latency, resiliency using both wired and wireless connections, and defines the bandwidth requirements of the daily call.

Prior to the schedule time, the control server sends an SNMP command to the router on one side of the planned link. The operating system in the router receives the SNMP instructions and constructs a virtual, OSI communication model Layer 2 Ethernet interface consisting of four real links: one fiber WAN connection, one VPN connection over a backup cable network interface that normally routes to the public internet, and two cellular connections that use LTE to route to the public internet and a PN to then ingress to the private network. Link grading information is sent along with the link bonding request that ensures any link whose latency goes above the threshold of the video conference application will be dropped until its latency again goes below the threshold. The link is configured to forward multiple copies of each packet to reduce resend latency, because the control application computes that enough available bandwidth will be present based on the bonding of the 4 links, so as to cover the redundant packets.

The router, or the virtualization manager associated with the router, constructs the bonded link with a gateway of the hub of the network. That router has control over Ethernet frames sent over the virtual interface and these frames can be constructed in network-offload hardware.

After the scheduled duration of the call, another SNMP instruction is sent to the remote router (or another networking device or entity, or a network management entity or SDN/NFV management entity associated with any of these) and the virtual interface is destroyed, until it is needed again the following day.

In some embodiments of the present invention, a device containing multiple wireless network interfaces, multiple-operator cellular network interfaces, and WiFi and SAT-COM, or any subset, is brought into a disaster area. The local or remote virtualization manager assigns the device to one or more groups, or sets, of network interfaces creating one or more bonds. The virtualization manager knows which bond to use for which traffic, how to load balance the overall traffic over each bond, and in case where multiple devices operate in the area, how to make them work together in coordination so that congestion is prevented or minimized.

In some embodiments of the present invention, the remote or local virtualization manager may decide on data routing according to current cost or price of each link or the traffic on each, on data package being already consumed on each at that point in time out of the overall package for that link at that time, or on other cost related parameters. For example, a certain wireless network interface may be included in a bond, yet with a certain traffic limitation, because the data consumption up to that point in time leaves a relatively or absolutely small data volume before either the price is increased or performance is reduced by the wireless provider/operator. This information or instructions may be transferred between virtualization manager and the wireless operators, via the SDN/NFV abstraction layer and interfaces.

In some embodiments of the present invention, a user may buy data volume on demand, such as by top-up or by buying a separate and new volume or package. This information, from the data package provider (which in many instances is the wireless operator/provider), is then relayed to the virtualization manager via the abstraction layer which now takes the limitations of the data package into account when considering routing alternatives, network interfaces and connections, and utilization.

In some embodiments of the present invention, the virtualization manager can configure a certain bond connection to change its network functionality, such as to configure the bond connection to realize a virtual pipe connection, a router for that location serving multiple devices, or a bridge or a hub.

In some embodiments of the present invention, the virtualization manager can configure different protocols transparently to the overall routing path and other network elements such as the ISP routers. This may be done by applying various encapsulations, internal protocols, session terminations and renewals. The control over which method to use at which node, over which connection, at which time, is done by the virtualization manager, which maintains information of the network performance over multiple routes.

For example, a TCP session over the bonded wireless virtual connection, includes one or more wireless network interfaces (OSI layer 3 and above), may be too slow over that connection. Since TCP employs mechanisms by which packet error or delay impact performance by increasing the RTT, TCP back-offs (making TCP buffers longer and longer due to packet errors or loss), or similar timers, the bonding engine may decide to implement TCP termination, or TCP proxies, permanently for any given connection or temporarily due to current/temporary or predicted performance of any or all of the connections, links, or network interfaces participating in that specific bond. This termination may be done in either over the uplink or downlink, or over both, according to the performance of each of these links and the performances of the participating connections in that bonding direction. It may also inform the cellular or wireless operator's network elements that there is a TCP session over its associated connection, for which poor or insufficient performance is experienced, and attempt to terminate air-interface level TCP protocols, or re-transmissions, or other fault recovery mechanisms, so that overall, between the air-interface level (such as LTE or 3G or WiFi layers) and the bonding level (application level, or transport or routing level), an optimized approach is coordinated. This may occur while initiating or maintaining a connection.

The abstraction layer allows this communication between the bonding entity, the network management or SDN/NFV management entity (e.g., virtualization manager), and the relevant entities of other services providers handling the traffic such as the cellular operator entities handling the air-interface. Using such mechanisms internally allows service providers to treat the bonded links transparently, without knowing of their existence, way of operations, current connections, performance etc. Using protocols to communicate between these elements and the bonding entity or the network management or SDN/NFV management entity (e.g., virtualization manager) allows them to further optimize the service level by coordinating lower layer parameters (such as retransmissions, Forward-Error-Correction (FEC) parameters, or other air-interface or IP routing parameters) with the bond connection performance as a whole, or with any of the connections, or network interfaces, or operators that participate in that bond.

In some embodiments of the present invention, the remote field unit, or the gateway or the network management entity or SDN/NFV management entity may request the infrastructure to allocate certain resources that currently are selected only by the infrastructure. For example, the remote field unit may request the cellular network of Operator A, on which at least one of the multi-connections (or multiple cellular network interfaces, or dongles) communicate, to use a certain BTS, sector, antenna or antennae array or beams (e.g., in a multiple antenna-array cellular infrastructure systems). In this manner, the virtualization manager decides as to which resources to use for which connection at which time are distributed, or assisted by distributed systems, other than the regular cellular operator network.

Some reasons in which the virtualization manager may request to change BTS, sector, antenna or antennae array, or beams, may include: congestion experienced in specific resources (e.g., trying to move to other infrastructure resources), coordinated management of multiple connections (or cellular network interfaces) co-located within the same single multi-link remote or local field unit regardless if they all belong to the same user or not, attempting to create diversity (e.g., some of the network interfaces work with some resources, other network interfaces in the same or co-located remote field unit work with other resources of the same operator) for reliability, or "goodput", or another improving other performance metrics in the field unit that has multiple network interfaces associated and connected to the field unit, mobility or predicted mobility into an area assumed to be better served by the new resources, better performance for some of the applications using the remote field unit multi-network interfaces whereas other applications do not necessarily need such better performance, etc.

The requesting entity may not be aware of the infrastructure configuration or resources. For example, the requesting entity may ask a cellular network to initiate a trial with a remote BTS. When the trial is granted and performance are met, the requesting entity may request to remain on that BTS for the remainder of the session, or may automatically be maintained on that trial BTS (e.g., sector, antenna, beam, or array).

In some embodiments of the present invention, modems, smartphones, tablets, and any other connectivity, or mobile, device may join or disjoin from a bonded connection. The bonding entity may accept requests to join the bonding service as yet another connection/modem, with or without restrictions and limitations (such as maximum data capacity to use over that modem/connection/link, or types of applications allowed or disallowed on it etc). Alternatively, the bonding entity may also initiate such option by requesting a newly detected connectivity device in its vicinity to take part in a bonded connection. The detection may be standard-based, such as via Bluetooth, NFC, location application or other means. The device user may thus enjoy better connectivity during the bonding session because, for example, when moving through the region, the device operating over a certain operator may experience lower bandwidth due to poor coverage at one point, whereas another device participating in this ad-hoc bonding connection may operate on another cellular, or WiFi, operator which at the same time and location has better coverage and goodput. Suddenly, the situation may change and the other user shall enjoy the better connectivity offered by the first user's device.

The bonding entity on the edge device, or the virtualization manager, may send and receive connection-related information to the candidate device for this bond connection session. The bonding entity, or virtualization manager may authorize the connection, reject the connection (for example, candidate device identified as a "rogue" device), understand the candidate device capabilities, associate data package or other data capacity or volume limitations, accounting and billing scheme (such as "voluntary", pay-per-use, part of an overall subscription plan etc). Accordingly the virtualization manager may then set up, tear down, and dynamically modify such ad-hoc self-setting bonded connections, and hence, network routing and connectivity.

In some embodiments of the present invention, a connected car has a bonding entity in its cellular modem or a processor entity responsible for its connectivity. The bonding entity may have an associated cellular, or WiFi, modem installed in the car. When a driver gets into the car, his smartphone connects with the car processor via Bluetooth pairing, for example. The bonding entity residing on the car processor may then connects with the smartphone processor, application, or software layer and request that the driver's smartphone becomes part of a bonded connection. Since this smartphone had been previously registered as pairing with car's processor, the bond connection may be automatically accepted. So now the car provides bonded connectivity, using the smartphone cellular modem as a second modem participating in this bond connection. The data is relayed between the smartphone and the car processor over standard means, such as the local WiFi where one of the devices behaves as an access point, or even over Bluetooth (in case of sufficient bandwidth) or other protocols.

When another passenger is riding in the car, his smartphone may request a bonded connection to the car's processor (e.g., access to the car's cellular modem). In a similar process, his smartphone's request may accepted or rejected to be part of the bonded connection. When the passenger leaves the car, or at another trigger, his smartphone is removed from the bond connection either via communication with the bonding entity or automatically when the bonding entity identifies no communication with this smartphone or over this smartphone for a certain period of time.

In some embodiments of the present invention, a SDN/NFV managing entity, or the bonding entity, may set up, tear down, and dynamically change and control both the network element components (which modems, smartphones, operators, connections) and the traffic over them (which protocols, applications, bandwidth consumed, SLAs, QoS, etc), both in total and per each of them. The bond connection may be a dynamic ad-hoc networking element (router, modem, hub, switch etc) with different IP routes and paths from session to session, with different account billing options in each, in accordance to the participating elements. Similarly, the bonding entity may also reside in a smartphone, so that when it identifies another device to bond with, for example, another smartphone of a family member or a friend in its vicinity, or a home cable/satellite modem when entering into house, the bonding entity may choose to accept the request from a given cellphone to participate in a bond connection.

Figure 4:
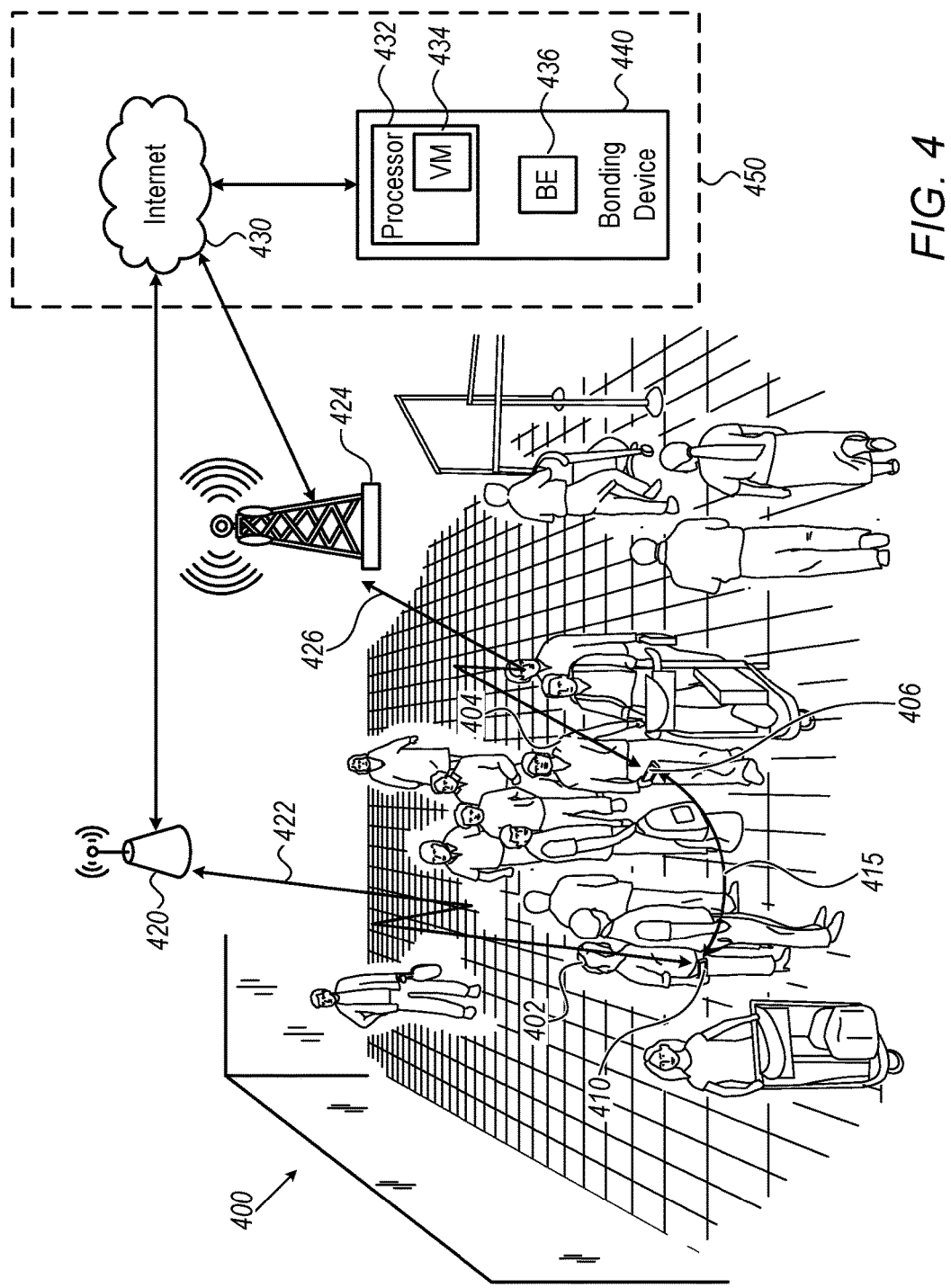
FIG. 4 illustrates management of an ad-hoc network by a virtualization manager, in accordance with some embodiments of the present invention.

FIG. 4 illustrates management of an ad-hoc network 415 by a virtualization manager 434, in accordance with some embodiments of the present invention. In an area 400, such as an airport terminal, a first man 402 holding a first cellphone 402 communicates over a first wireless data channel 422 with a Wi-Fi access point 420 to access a first application running on a remote server located in another country via internet 430. A second man 404 holding a second cellphone 406 communicates over a second wireless data channel 426 with a cellular basestation 424 using a cellular protocol such as 3G or LTE to access a second application running on a second remote server via internet 430.

The Wi-Fi connection 420 suddenly becomes congested and the performance of link 422 degrades. A bonding entity on cellphone 410 searches for other devices in area 400 to bond with and identifies cellphone 406 as a candidate. The bonding entity on cellphone 410 sends a request to cellphone 406 to bond. The request is accepted by cellphone 406 and ad-hoc bonding network 415 is formed. Moreover, to optimize the transfer of data between cellphone 410 and the first application running on a first remote server in another country, processor 432 receives network data about the ad-hoc bond 415 on another bonding device 440 remotely located in a region 450. A remote bonding engine 436 is used to process the data streams from the ad-hoc network to reconstruct the data for use by the first application which may reside on bonding device 440 or another remote server. VM 434 accesses routing data stored in a memory. VM 434 evaluate the network conditions from area 400 to the first remote server running the application used by cellphone 410. VM 434 assesses that for optimal communication based on operator information, or SLA, 25% of the data traffic from the first remote server to cellphone 410 should be sent through wireless access point 420 and 75% of the data traffic through the cellular operator associated with basestation 424 via cellphone 406. This optimization by VM 434 also accounts for optimized routings through multiple intermediary networks between cellphone 410 en-route to the first remote server, not shown in FIG. 4.

The ad-hoc bonding process and the subsequent description of optimization of the data transfer from the first remote server to cellphone 410 using the virtualization manager as shown in FIG. 4 is merely for conceptual clarity, and not by way of limitation of some embodiments of the present invention. Alternatively and additionally, virtualization managers may be implemented inside the smartphones (e.g., inside cellphone 406 and cellphone 410).

In some embodiments of the present invention, creating the ad-hoc network includes using a short-range wireless protocol (e.g., Bluetooth) to bond the two or more mobile devices, and the split data is then communicated using a wireless IP protocol such as Wi-Fi.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computing method of using a processor to manage a virtualization of a network bonding connection, the method comprising:

organizing one or a plurality of network bonding engines, each of the network bonding engines configured to split input data from at least one input data source into a plurality of data streams communicated over a plurality of wireless IP modems of different performance characteristics, and to reassemble the input data from said plurality of data streams;

wherein the organizing of said one or a plurality of network bonding engines comprises choosing two or more wireless IP modems from the plurality of wireless IP modems to form dynamically, according to network conditions, two or more bonding groups wherein at least one wireless IP modem is included in more than one bonding group at the same time; and virtualizing each bonding group and assigning at least one network function to each of the two or more bonding groups such that each bonding group is associated with performance parameters and provides service to input data according to its assigned network function, wherein the network functions are selected from the group consisting of a hub, a router, a switch, a databridge, and an audio/video transmitter;

communicating the input data via the virtualized bonding groups according to the network function assigned to the virtualized bonding groups; and altering the formation of the bonding groups according to the performance of modems associated with virtualized bonding groups and the requirements of the input data;

wherein each virtualized bonding group splits the input data among the IP modems associated that virtualized bonding group.

2. The method according to claim 1, wherein the different performance characteristics are selected from the group consisting of: a link throughput, a link goodput, a link temporal jitter, a link latency, a quality of service, a bandwidth, a wireless technology, an error correction method, a chosen basestation, a data package, a service level agreement (SLA), a service type, a different IP routing, different cellular operators, a channel capacity, and an area coverage.

3. The method according to claim 1, wherein choosing the one or more wireless modems to form the one or more bonding groups comprises creating an ad-hoc network between two or more bonded mobile devices.

4. The method according to claim 3, wherein creating the ad-hoc network comprises using a short-range wireless protocol to bond the two or more mobile devices, and further comprising communicating the split data using a wireless IP protocol.

5. The method according to claim 1, wherein the one or more bonding groups remain static over a session.

6. The method according to claim 1, wherein the one or more bonding groups dynamically change within a session in response to changing network conditions.

7. The method according to claim 1, further comprising changing the chosen one or more wireless IP modems in the one or more bonding groups through which the split data is communicated so as to optimize the communication of the split data in accordance with network conditions.

8. The method according to claim 1, further comprising detecting by one of said one or a plurality of network bonding engines a failure in communicating one or more of the plurality of data streams, and sending by the network bonding engine a failure alert to another network bonding engine of said one or a plurality of network bonding engines.

9. The method according to claim 1, further comprising forwarding network security requirements by one of said one or a plurality of network bonding engines to another of said one or a plurality of network bonding engines.

10. The method according to claim 9, further comprising changing the chosen one or more wireless IP modems in the one or more bonding groups in accordance with the forwarded network security requirements.

11. The method according to claim 1, wherein at least two bonding groups of the one or more bonding groups are formed from the same IP modems of said plurality of wireless IP modems.

12. The method according to claim 1, wherein two of said one or a plurality of network bonding engines are associated with said plurality of wireless IP modems.

13. The method according to claim 1, wherein at least one of said plurality of wireless IP modems have network parameters that change over time.

14. A system for managing a virtualization of a network bonding connection, the system comprising:
 a memory; and
 a processor configured to:
  organize one or a plurality of network bonding engines, each of the network bonding engines configured to split input data from at least one input data source into a plurality of data streams communicated over a plurality of wireless IP modems of different performance characteristics, and to reassemble the input data from said plurality of data streams;
  wherein the organizing of said one or a plurality of network bonding engines comprises choosing two or more wireless IP modems from the plurality of wireless IP modems to form dynamically, according to network conditions, two or more bonding groups wherein at least one wireless IP modem is included in more than one bonding group at the same time; and virtualizing each bonding group and assigning at least one network function to each of the two or more bonding groups such that each bonding group is associated with performance parameters and provides service to input data according to its assigned network function, wherein the network functions are selected from the group consisting of a hub, a router, a switch, a databridge, and an audio/video transmitter;
  communicating the input data via the virtualized bonding groups according to the network function assigned to the virtualized bonding groups; and
  altering the formation of the bonding groups according to the performance of modems associated with virtualized bonding groups and the requirements of the input data;
  wherein each virtualized bonding group splits the input data among the IP modems associated that virtualized bonding group.

15. The system according to claim 14, wherein the different performance characteristics are selected from the group consisting of: a link throughput, a link goodput, a link temporal jitter, a link latency, a quality of service, a bandwidth, a wireless technology, an error correction method, a chosen basestation, a data package, a service level agreement (SLA), a service type, a different IP routing; different cellular operators, a channel capacity, and an area coverage.

16. The system according to claim 14, wherein the processor is configured to choose the one or more wireless modems to form the one or more bonding groups by creating an ad-hoc network between two or more bonded mobile devices.

17. The system according to claim 14, wherein the one or more bonding groups remain static over a session.

18. The system according to claim 14, wherein the one or more bonding groups dynamically change within a session in response to changing network conditions.

19. The system according to claim 14, wherein the processor is configured to change the chosen one or more wireless IP modems in the one or more bonding groups through which the split data is communicated so as to optimize the communication of the split data in accordance with network conditions.

20. The system according to claim 14, wherein the processor is configured to detect by one of said one or a plurality of network bonding engines a failure in communicating one or more of the plurality of data streams, and to send by the network bonding engine a failure alert to another network bonding engine of said one or a plurality of network bonding engines.

21. The system according to claim 14, wherein the processor is configured to forward network security requirements by one of said one or a plurality of network bonding engines to another of said one or a plurality of network bonding engines.

22. The system according to claim 21, wherein the processor is configured to change the chosen one or more wireless IP modems in the one or more bonding groups in accordance with the forwarded network security requirements.

23. A computing method of using a processor to manage a virtualization of a network bonding connection, the method comprising:
 organizing one or a more network bonding engines, each of the network bonding engines configured to split input data from at least one input data source into a plurality of data streams communicated over a plurality of wireless IP modems of different performance characteristics, and to reassemble the input data from said plurality of data streams;

wherein the organizing of said one or a plurality of network bonding engines comprises choosing two or more wireless IP modems from the plurality of wireless IP modems to form dynamically, according to network conditions, two or more bonding groups wherein at least one wireless IP modem is included in more than one bonding group at the same time; and virtualizing each bonding group and assigning at least one network function to each of the two or more bonding groups such that each bonding group is associated with performance parameters and provides service to input data according to its assigned network function;

wherein at least two bonding groups of the two or more bonding groups use the same IP modems of said plurality of wireless IP modems;

communicating the input data via the virtualized bonding groups according to the network function assigned to the virtualized bonding groups; and altering the formation of the bonding groups according to the performance of modems associated with virtualized bonding groups and the requirements of the input data;

wherein each virtualized bonding group splits the input data among the IP modems associated that virtualized bonding group.

24. The method according to claim 1, wherein the one or more bonding groups comprise two or more bonding groups, the method further comprising changing the chosen one or more wireless IP modems in the two or more bonding groups through which the split data is communicated so as to optimize the communication of the split data in accordance with network conditions.

* * * * *